(12) United States Patent  
Boriah et al.

(10) Patent No.: US 8,958,603 B2
(45) Date of Patent: Feb. 17, 2015

(54) AUTOMATED MAPPING OF LAND COVER USING SEQUENCES OF AERIAL IMAGERY

(71) Applicants: Shyam Boriah, Minneapolis, MN (US); Ankush Khandelwal, Minneapolis, MN (US); Vipin Kumar, Plymouth, MN (US); Varun Mithal, Minneapolis, MN (US); Karsten Steinhaeuser, St. Paul, MN (US)

(72) Inventors: Shyam Boriah, Minneapolis, MN (US); Ankush Khandelwal, Minneapolis, MN (US); Vipin Kumar, Plymouth, MN (US); Varun Mithal, Minneapolis, MN (US); Karsten Steinhaeuser, St. Paul, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 145 days.

(21) Appl. No.: 13/835,022

(22) Filed: Mar. 15, 2013

(65) Prior Publication Data

US 2014/0212055 A1   Jul. 31, 2014

Related U.S. Application Data

(60) Provisional application No. 61/756,715, filed on Jan. 25, 2013.

(51) Int. Cl.
*G06K 9/00* (2006.01)
*G06F 17/30* (2006.01)
*G06K 9/62* (2006.01)

(52) U.S. Cl.
CPC ........ *G06F 17/30247* (2013.01); *G06K 9/0063* (2013.01); *G06K 9/6267* (2013.01); *G06F 17/30241* (2013.01)

USPC ................................ 382/109; 382/224; 702/5

(58) Field of Classification Search
USPC ................................ 382/109, 113, 224; 702/5
See application file for complete search history.

(56) References Cited

U.S. PATENT DOCUMENTS

| 5,719,949 A * | 2/1998 | Koeln et al. .................... 382/113 |
| 2006/0136126 A1 | 6/2006 | Coombes et al. |
| 2006/0294062 A1 | 12/2006 | Folchetti et al. |
| 2007/0047820 A1 | 3/2007 | Vaatveit |
| 2010/0111428 A1 | 5/2010 | Yu et al. |
| 2011/0055253 A1 | 3/2011 | Yoo et al. |
| 2011/0064280 A1 * | 3/2011 | Sasakawa ..................... 382/113 |
| 2012/0154584 A1 | 6/2012 | Omer et al. |
| 2012/0288163 A1 * | 11/2012 | Antolin et al. ................. 382/113 |

OTHER PUBLICATIONS

PCT International Search Report and Written Opinion dated May 16, 2014 for corresponding PCT Application No. PCT/US2014/012923.
M. Alberti, The Effects of Urban Patterns on Ecosystem Function. IRSR, 2005.
J. Barros. Urban Growth in Latin American Cities. PhD thesis, University College London, 2004.

(Continued)

*Primary Examiner* — John Strege
(74) *Attorney, Agent, or Firm* — Westman, Champlin & Koehler, P.A.; Theodore M. Magee

(57) ABSTRACT

A system has an aerial image database containing sensor data representing a plurality of aerial images of an area having multiple sub-areas. A processor applies a classifier to the sensor values to identify a label for each sub-area in each aerial image and to thereby generate an initial label sequence for each sub-area. The processor identifies a most likely land cover state for each sub-area based on the initial label sequence, a confusion matrix and a transition matrix. For each sub-area, the processor stores the most likely land cover state sequence for the sub-area.

19 Claims, 19 Drawing Sheets

(56) References Cited

OTHER PUBLICATIONS

E. Bartholomé and A. Beiward. Glc2000: a new approach to global land cover mapping from earth observation data. MRS, 2005.

Ciesin, Global Rural-Urban Mapping Project (GRUMP), http://sedac.ciesin.columbia.edu/data/collection/grump-v1, 2004, 2 pages.

Dietterich, Machine Learning for Sequential Data: A Review, Structural, Syntactic, and Statistical Pattern Recognition, 2002, 15 pages.

C. Elvidge et al. Global distribution and density of constructed impervious surfaces. Sensors, 2007.

P.O. Gislason et al., Random forests for land cover classification. Pattern Recognition Letters, 27(4):294-300, 2006.

C. Huang, L. S. Davis, and J. R. G. Townshend. An assessment of support vector machines for land cover classification, International Journal of Remote Sensing, 23(4):725-749, 2002.

E. Jaser et al. Temporal post-processing of decision tree outputs for sports video categorisation. SSSPR, 2004.

D. Liu et et al. A spatial—temporal approach to monitoring forest disease spread using multi-temporal high spatial imagery. RSE, 2006.

D. Potere et al. Mapping urban areas on a global scale: which of the eight maps now available is more accurate?. IJRS, 2009.

L. Rabiner. A tutorial on hidden markov models and selected applications in speech recognition. Readings in speech recognition, 1989.

A. Schneider et al, A new map of global urban extent from MODIS satellite data. Environmental Research Letters, 2009.

K. C. Seto et al, Global forecasts of urban expansion to 2030 and direct impacts on biodiversity and carbon pools. PNAS, 2012.

J. Suutala et al. Discriminative temporal smoothing for activity recognition from wearable sensors. Ubiquitous Computing Systems, 2007.

H. Taubenböck et al. Monitoring urbanization in mega cities from space. RSE, 2012.

United Nations Environment Programme (UNEP). Keeping Rack of Our Changing Environment: Prom Rio to Rio +20 (1992-2012). 2011.

U.S. Geological Survey, Landsat Missions, http://landsat.usgs.gov/, 2013, 3 pages.

Q. Lu and Q. Weng. A survey of image classification methods and techniques for improving classification performance. International Journal of Remote Sensing, 28(5):823-870, 2007.

P. Coppin, I. Jonckheere, K. Nackaerts, B. Muys, and E. Lambin. Digital change detection methods in ecosystem monitoring: A review. International Journal of Remote Sensing, 25(9):1565-1596, 2004.

D. Lu, P. Mausel, E. Brondizio, and E. Moran. Change detection techniques. International Journal of Remote Sensing, pp. 2365-2407, 2004.

\* cited by examiner

Confusion Matrix $$M = \begin{bmatrix} P(c_t^i = U | z_t^i = U) & P(c_t^i = V | z_t^i = U) & P(c_t^i = W | z_t^i = U) \\ P(c_t^i = U | z_t^i = V) & P(c_t^i = V | z_t^i = V) & P(c_t^i = W | z_t^i = V) \\ P(c_t^i = U | z_t^i = W) & P(c_t^i = V | z_t^i = W) & P(c_t^i = W | z_t^i = W) \\ P(c_t^i = U | z_t^i = mixed) & P(c_t^i = V | z_t^i = mixed) & P(c_t^i = W | z_t^i = mixed) \end{bmatrix}$$

Augmented Confusion Matrix $$M = \begin{bmatrix} P(c_t^i = U | z_t^i = U) & P(c_t^i = V | z_t^i = U) & P(c_t^i = W | z_t^i = U) & P(c_t^i = missing | z_t^i = U) \\ P(c_t^i = U | z_t^i = V) & P(c_t^i = V | z_t^i = V) & P(c_t^i = W | z_t^i = V) & P(c_t^i = missing | z_t^i = V) \\ P(c_t^i = U | z_t^i = W) & P(c_t^i = V | z_t^i = W) & P(c_t^i = W | z_t^i = W) & P(c_t^i = missing | z_t^i = W) \\ P(c_t^i = U | z_t^i = mixed) & P(c_t^i = V | z_t^i = mixed) & P(c_t^i = W | z_t^i = mixed) & P(c_t^i = missing | z_t^i = mixed) \end{bmatrix}$$

$$\text{TRANSITION MATRIX} \overbrace{\begin{bmatrix} P(z_t^i = U | z_{t-1}^i = U) & P(z_t^i = V | z_{t-1}^i = U) & P(z_t^i = W | z_{t-1}^i = U) & P(z_t^i = mixed | z_{t-1}^i = U) \\ P(z_t^i = U | z_{t-1}^i = V) & P(z_t^i = V | z_{t-1}^i = V) & P(z_t^i = W | z_{t-1}^i = V) & P(z_t^i = mixed | z_{t-1}^i = V) \\ P(z_t^i = U | z_{t-1}^i = W) & P(z_t^i = V | z_{t-1}^i = W) & P(z_t^i = W | z_{t-1}^i = W) & P(z_t^i = mixed | z_{t-1}^i = W) \\ P(z_t^i = U | z_{t-1}^i = mixed) & P(z_t^i = V | z_{t-1}^i = mixed) & P(z_t^i = W | z_{t-1}^i = mixed) & P(z_t^i = mixed | z_{t-1}^i = mixed) \end{bmatrix}}^{600} = X$$

602 labels the bottom row.

AUTOMATED MAPPING OF LAND COVER USING SEQUENCES OF AERIAL IMAGERY

CROSS-REFERENCE TO RELATED APPLICATION

The present application is based on and claims the benefit of U.S. provisional patent application Ser. No. 61/756,715, filed Jan. 25, 2013, the content of which is hereby incorporated by reference in its entirety.

This invention was made with government support under IIS-1029711 awarded by the National Science Foundation (NSF). The government has certain rights in the invention.

BACKGROUND

The physical surface of the earth is undergoing constant change: new cities are being built, existing cities are expanding, and lakes and other water bodies are changing their extent. In order to predict the effects of these changes and to develop policies to address them, it is important to have an accurate assessment of current land cover and how the land cover has changed over time.

One way to measure land cover is to classify areas based on aerial image data. Such image data includes spectral data for various frequencies such as red, green, and blue visual light frequencies and infrared light frequencies. Using this data, a classifier attempts to classify each area into a single land cover class such as urban, vegetation and water. Changes in land cover are then detected by determining when the classification for an area changes between two images of the area. Such classifiers are trained based on labeled examples of each type of land cover.

SUMMARY

A system has an aerial image database containing sensor data representing a plurality of aerial images of an area having multiple sub-areas. A processor applies a classifier to the sensor values to identify a label for each sub-area in each aerial image and to thereby generate an initial label sequence for each sub-area. The processor identifies a most likely land cover state for each sub-area based on the initial label sequence, a confusion matrix and a transition matrix. For each sub-area, the processor stores the most likely land cover state sequence for the sub-area.

Features for a set of temporally separated images of an area are retrieved from memory. The area is divided into a plurality of sub-areas and each sub-area has separate features for each of the temporally separated images, wherein the set of temporally separated images comprises more than two temporally separated images. The features of each sub-area of each image are classified such that a sequence of classes is identified for each sub-area, wherein the sequence of classes is ordered based on the temporal order of the temporally separated images. For each sub-area, the sub-area's sequence of classes is used to determine a combined likelihood for a set of state sequences for the sub-area, the set of state sequences representing all possible state sequences for the sub-area in which the sub-area was in a first state for a first image and in a second state for a second image. In response to the combined likelihood, a user interface for a display is generated to indicate which sub-areas changed from the first state to the second state between the first image and the second image.

A computer-readable storage medium has stored thereon computer-executable instructions that when executed by a processor cause the processor to perform steps that include classifying each pixel of a set of images into one of a set of classes, each class indicating a type of ground cover present in a geographic sub-area shown in a pixel. For a geographic sub-area, ground cover states of the geographical sub-area are identified based on the classes of the geographic sub-area's pixels in the set of images, wherein at least one of the ground cover states is not in the set of classes.

BRIEF DESCRIPTION OF THE DRAWINGS

FIG. 4 is an example of a confusion matrix.

FIG. 5 is an example of an augmented confusion matrix.

FIG. 6 is an example of a transition matrix.

DETAILED DESCRIPTION

Figure 1:
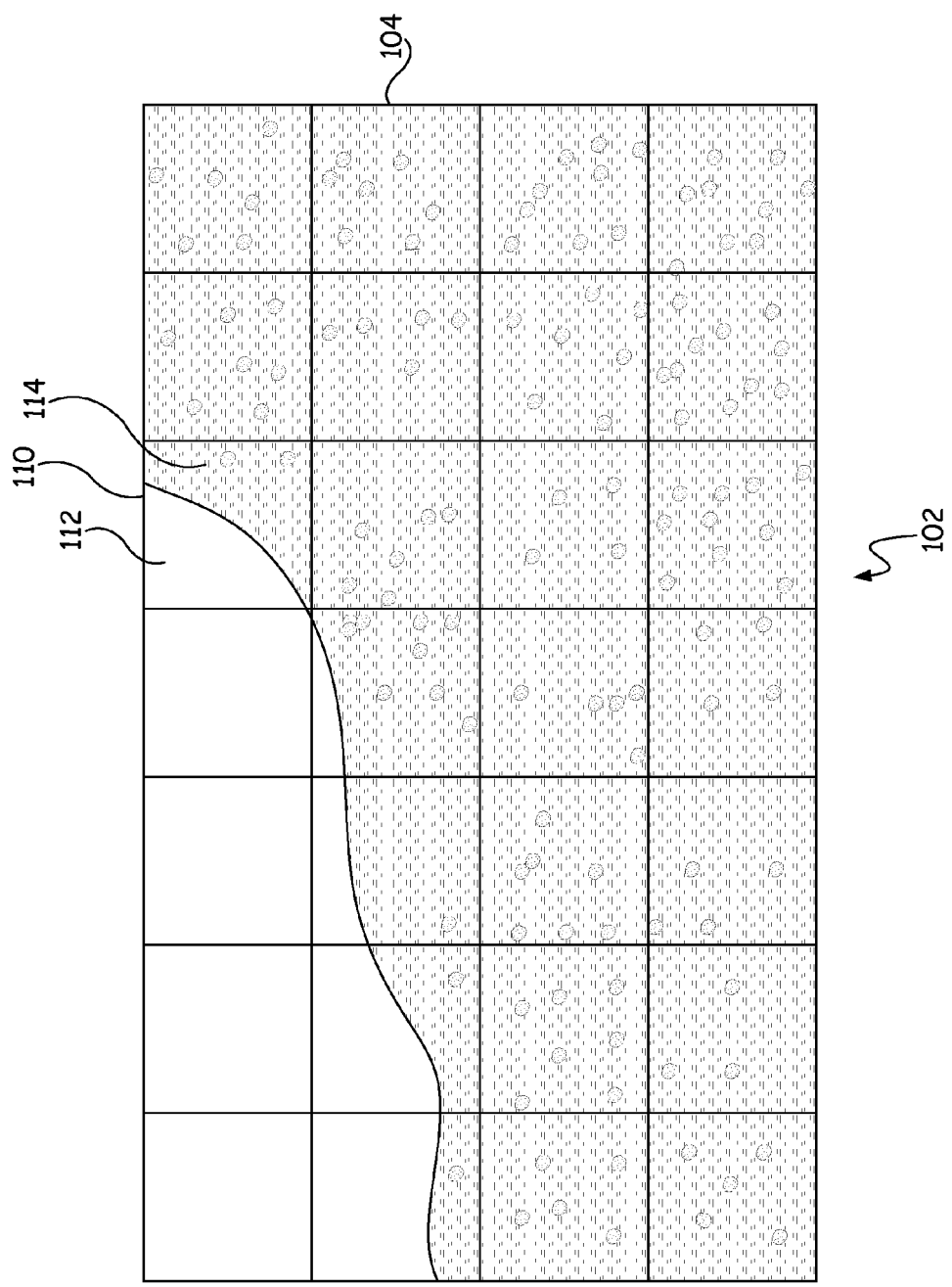
FIG. 1 is an example of an area divided into sub-areas at a first image capture time.

Existing land cover classifiers assign each pixel of an image to a land cover class based on spectral data for the pixel. These classifiers have limited accuracies and even when assisted by input from a domain expert generally have accuracies between 85% and 95%. The present inventors have determined that the poor performance of the land cover classifiers is due to a number of factors including: pixels often include a mixture of classes; the feature space is unstable due to variability in the sun angle, atmosphere and image registration; multi-modality within individual classes (e.g., different kinds of trees); and a lack of high quality training data.

The current accuracy of classifiers causes poor precision in determining which areas have changed between two successive images. In particular, since the percent of areas that actually change cover states is less than 1% of the total area in an image, only 5% of sub-areas that are identified as changing between two images have actually changed. Thus, under the prior art, 95% of the sub-areas identified as having changed between two images have in fact not changed. Even if it was possible to improve the classifier's accuracy to 99%, the expected precision for a change detection query is only 33% due to the small percentage of land cover that changes over time.

Embodiments described below reduce the inaccuracy of land cover classification and improve the precision in detecting land cover change by utilizing a temporal sequence of images for an area. For each image, a base classifier assigns the area to a land cover class based on the spectral data collected for the area. This results in a sequence of land cover classes for the area. A confusion matrix is formed that provides probabilities of land cover classes being assigned to areas with various true land cover states and a transition matrix is formed that provides probabilities for changing between true land cover states. The sequence of land cover classes, the confusion matrix and the transition matrix are then used to identify a most likely sequence of land cover states for the area. The sequence of land cover classes, the confusion matrix, and the transition matrix are also used to determine a change score that represents the likelihood that an area's land cover state changed from a first state at a first image capture time to a second state at a second image capture time. The change score indicates a confidence in a change in state for the sub-area between two images using the sub-area's entire sequence of classes, a confusion matrix and a transition matrix. Since the entire sequence of classes is used, the change score is based on more information than traditional bi-temporal change detection that only gives a Boolean change/no change decision based on the classes of the sub-area for two images.

In the discussion below, a geographic area is divided into fixed, regular shaped sub-areas. The spectral data captured for the entire geographic area at a single capture time is referred to as an image and the spectral data captured for a sub-area at a single capture time is referred to as a pixel.

Figure 2:
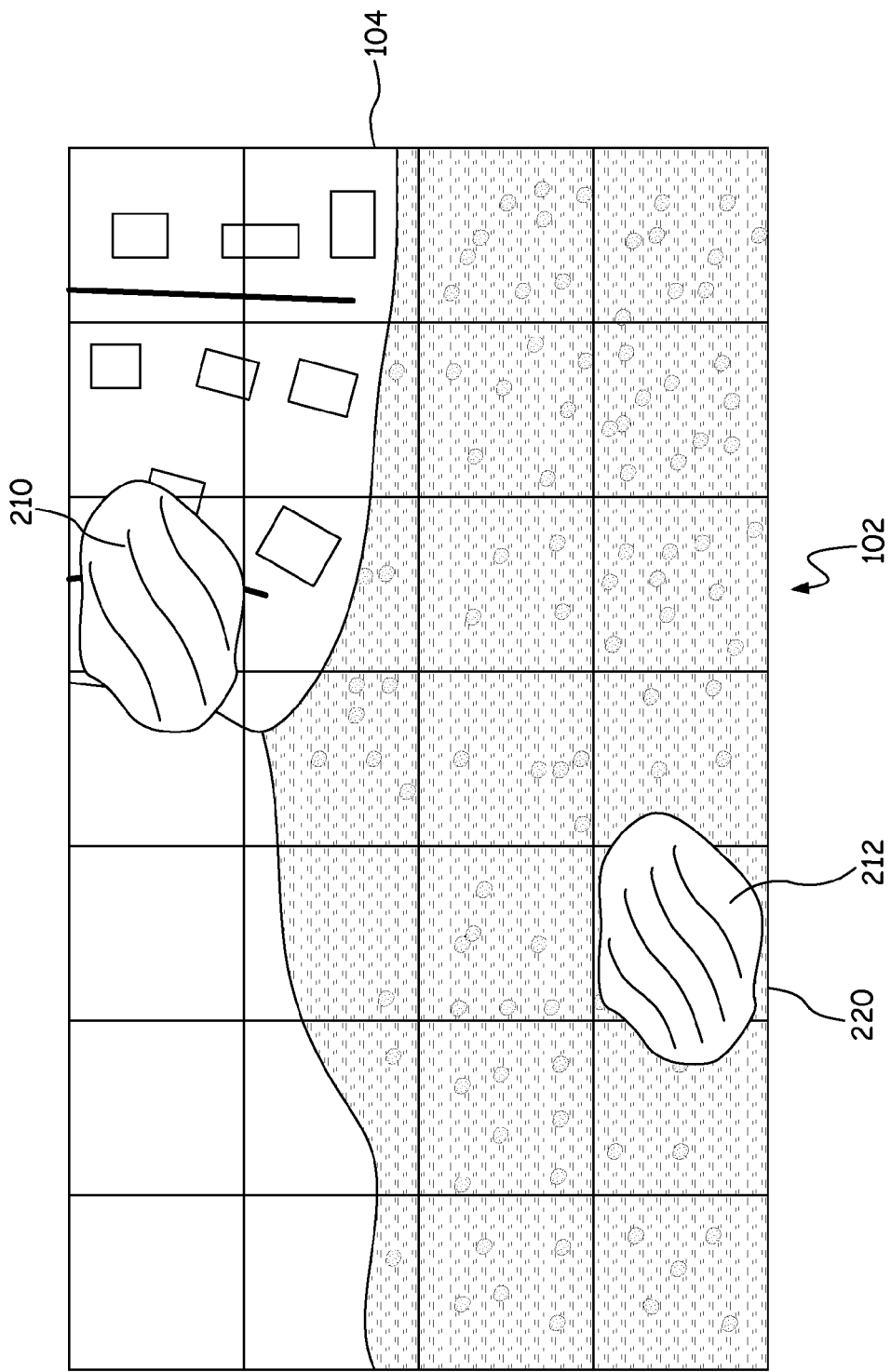
FIG. 2 is an example of the area of FIG. 1 divided into sub-areas at a second image capture time.
Figure 3:
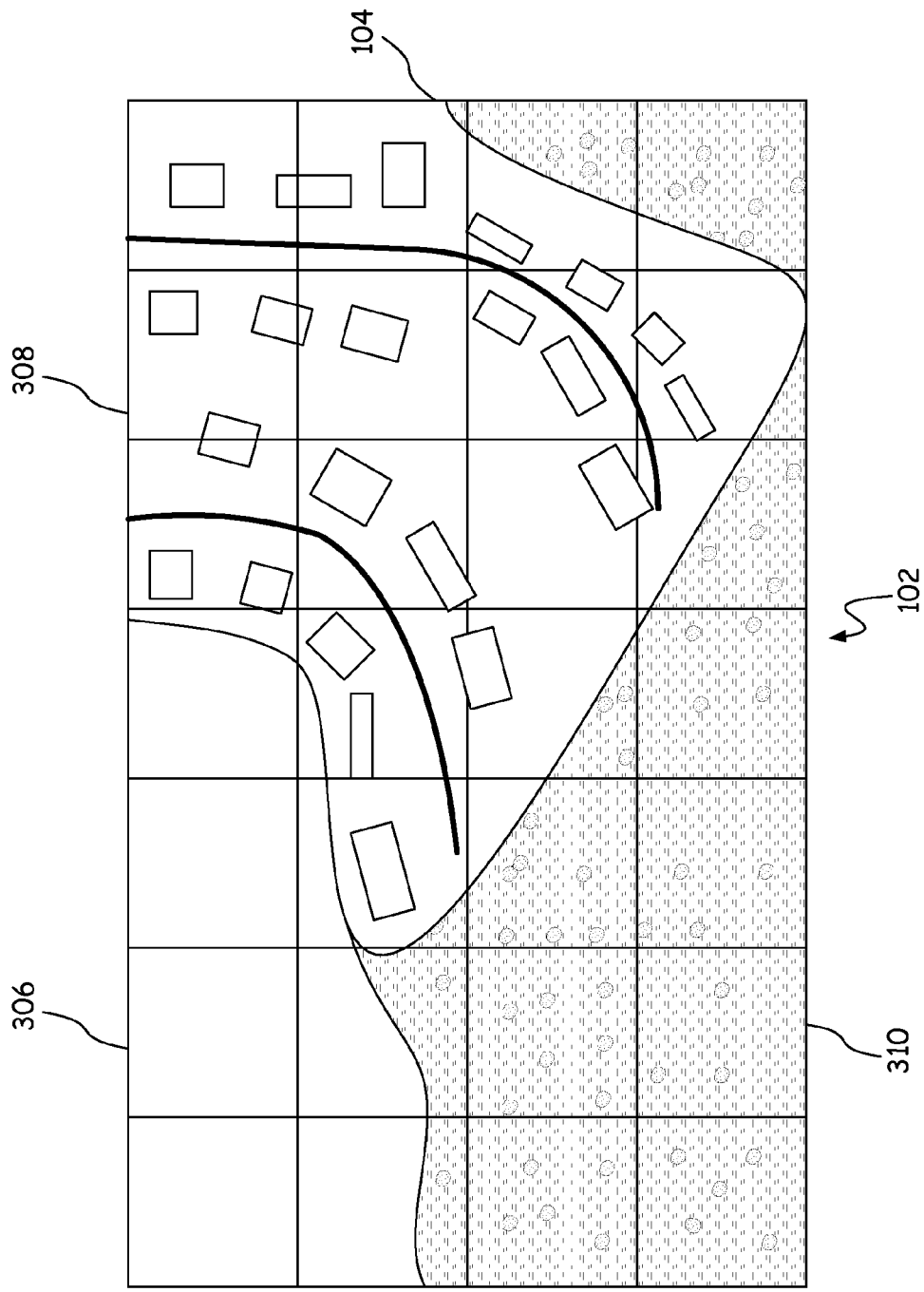
FIG. 3 is an example of the area of FIG. 1 divided into sub-areas at a third image capture time.

FIGS. 1-3 show aerial views of a geographic area 102 as it changes over time, with FIG. 1 showing the initial land cover, FIG. 2 showing later land cover, and FIG. 3 showing the latest land cover. As shown in FIG. 2, the view of the land cover can sometimes be obscured by clouds such as clouds 210 and 212.

In FIGS. 1-3, geographic area 102 is divided into twenty-eight square geographic sub-areas (referred to as sub-areas below), such as square sub-areas 104, 110, 220, 306, 308 and 310. As shown most clearly in FIG. 3, three types of land cover are depicted in FIGS. 1-3: water, urban and vegetation. For example, sub-area 306 is covered by water, sub-area 308 is covered by urban structures, sub-area 310 is covered by vegetation, and sub-area 110 is partially covered by water and partially covered by vegetation.

As shown in the sequence of FIGS. 1-3, the urban land cover initially is not present in area 102 but slowly extends into area 102 by replacing the vegetation land cover and a portion of the water land cover.

Although geographic area 102 is divided into square sub-areas in FIGS. 1-3, other shapes may be used for the sub-areas such as hexagons. Often, the shape of the sub-areas will be dictated by the shape of the smallest sub-area captured by the sensors of the aerial camera used to photograph the area. The size of the sub-area determines the resolution of the eventual land cover classification and change detection.

For each sub-area, image data is collected by one or more sensors at various image capture times. During a single image capture, multiple sensors may capture data for a single sub-area. For example, separate sensors for red, blue and green light wavelengths, and for various infrared wavelengths may be used for a single sub-area. Additionally or alternatively, multiple sensors for a same wavelength may be used such that each sensor captures only a portion of a sub-area but the sensors together capture all of the sub-area.

The sensor data collected for a sub-area over a set of image capture times may be referred to as a sequence of pixels or a sequence of sensor data. Each of the pixels in a sequence of pixels for a sub-area may be assigned a class label by a baseline classifier to form a class sequence or label sequence for the sub-area. Examples of class labels include Urban, Vegetation, Water and Missing. The "Missing" label indicates that the sensor data of the pixel is insufficient or does not provide enough information to classify the pixel in one of the other classes. For example, the pixel for sub-area 220 would be labeled as "Missing" because cloud 212 obscures the view of the land cover of sub-area 220. The class labels in the label sequence are only an estimate of the true land cover of the sub-area. The true land cover of a sub-area is referred to as the land cover state, or simply the state, of the sub-area.

The land cover state of a sub-area may be different from the class label due to noise in the data or classifier inaccuracy. The difference between the class label and the land cover state of a sub-area is referred to as confusion in the discussion below. The class label sequence for a sub-area i is referred to below as $c^i$ and the land cover state sequence is referred to as $z^i$. An individual label or class for a single image capture time t of sub-area i is referred to as $c_t^i$. A land cover state for a sub-area at capture time t is referred to as $z_t^i$.

In accordance with one embodiment, a land cover state sequence $z^i$ is identified from a label or class sequence $c^i$ provided by a baseline classifier. In other words, the innovation attempts to overcome noise in the data and classifier inaccuracies to provide a more accurate estimate of the true land cover state of a sub-area over time by using a sequence of class labels for the sub-area. In the techniques described below, the true land cover state is considered to be hidden and may be referred to as being a latent land cover state.

To identify a sequence of land cover states from a sequence of class labels, embodiments utilize confusion probabilities that indicate the probability of a class label for a pixel at a capture time t given that the sub-area has a particular land cover state at capture time t. In one particular embodiment, a confusion matrix M is provided where each element $m_{kl}$ of the confusion matrix provides a probability $P(c_t^i=l|z_t^i=k)$ wherein l is the class label and k is the land cover state. Confusion matrix M contains a separate element for each combination of k and l. In accordance with some embodiments, the class label and land cover state of an element is referred to as a label-state pair or a class-state pair. In a particular embodiment, there is a set of label-state pairs or class-state pairs that includes: urban-urban, urban-vegetation, urban-water, vegetation-urban, vegetation-vegetation, vegetation-water, water-urban, water-vegetation, water-water, missing-urban, missing-vegetation, and missing-water. In a further embodiment, additional label state pairs of urban-mixed, vegetation-mixed, water-mixed and missing-mixed are provided in confusion matrix M. Note that these are just some examples of label-state pairs and in the more general case, other land cover labels and land cover states may be used to define other label-state pairs.

FIGS. 4 and 5 provide examples of two possible confusion matrices. In FIG. 4, the confusion matrix M is constructed for class labels U, V and W and land cover states U, V, W, and "mixed" where U stands for urban land cover, V stands for vegetation land cover, W stands for water land cover, and "mixed" indicates that more than one land cover is present in the sub-area. For example, element 400 of FIG. 4 provides the probability of a class label of water being assigned to the pixel when the true land cover state is also water and element 402 provides the probability of a class label of vegetation being assigned to a pixel when the true land cover state is mixed with more than one type of land cover in the sub-area. In accordance with some embodiments, a mixed state indicates that a sub-area contains land covers associated with two separate labels. In FIG. 5, the confusion matrix is augmented to include an additional class label of "Missing". Thus, additional elements 500, 502, 504, and 506 are added to the confusion matrix of FIG. 5 with each element providing provide the probability of the "Missing" class label when the actual cover state is urban, vegetation, water, and mixed, respectively. The augmentation of the confusion matrix is discussed further below.

To further improve the identification of the true land cover state, a transition probability is utilized that indicates the probability of transitioning between a first land cover state at time t−1 to a second land cover state time t. In accordance with one embodiment, a transition probability is determined for each of the possible transitions and together, the transition probabilities are represented as a transition matrix X. In accordance with one embodiment, a set of successive land cover states or state-state pairs is defined, wherein the set of successive land cover states or state-state pairs comprises: urban-urban, urban-vegetation, urban-water, urban-mixed, vegetation-urban, vegetation-vegetation, vegetation-water, vegetation-mixed, water-urban, water-vegetation, water-water, water-mixed, mixed-urban, mixed-vegetation, mixed-water, and mixed-mixed. For each state-state pair, a transition probability is provided in transition matrix X that provides the probability of a sub-area transitioning between the two states.

FIG. 6 provides an example of a transition matrix X for possible land cover states of urban, vegetation, water and mixed. Each element of the transition matrix shown in FIG. 6 provides the probability of a land cover state at time t given a land cover state at time t−1. For example, transition matrix element 600 provides the probability of a sub-area being covered by water at time t given that the sub-area was covered by urban structures at time t−1. Similarly, transition matrix element 602 provides the probability of a sub-area being covered by vegetation at time t given that the sub-area was covered by a mix of land covers at time t−1.

The embodiments described herein use a doubly embedded stochastic process to describe the formation of the classification labels. In the first stochastic process, a sub-area experiences changes in land cover states over time. In the second stochastic process, the land cover state of the sub-area at any one time is observed and classified.

Figure 7:
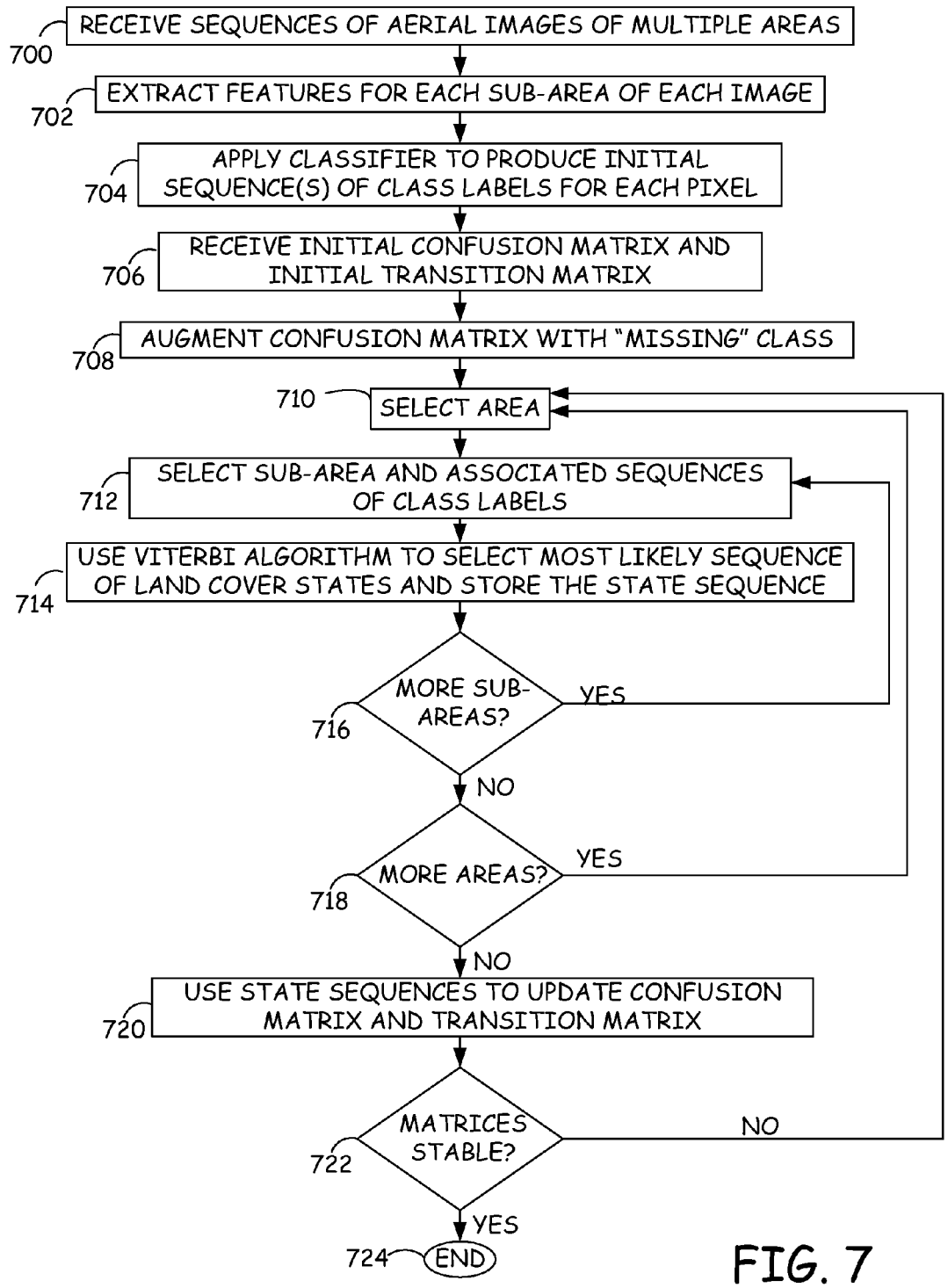
FIG. 7 is a flow diagram of a method of identifying a land cover state sequence from sequences of image data.
Figure 8:
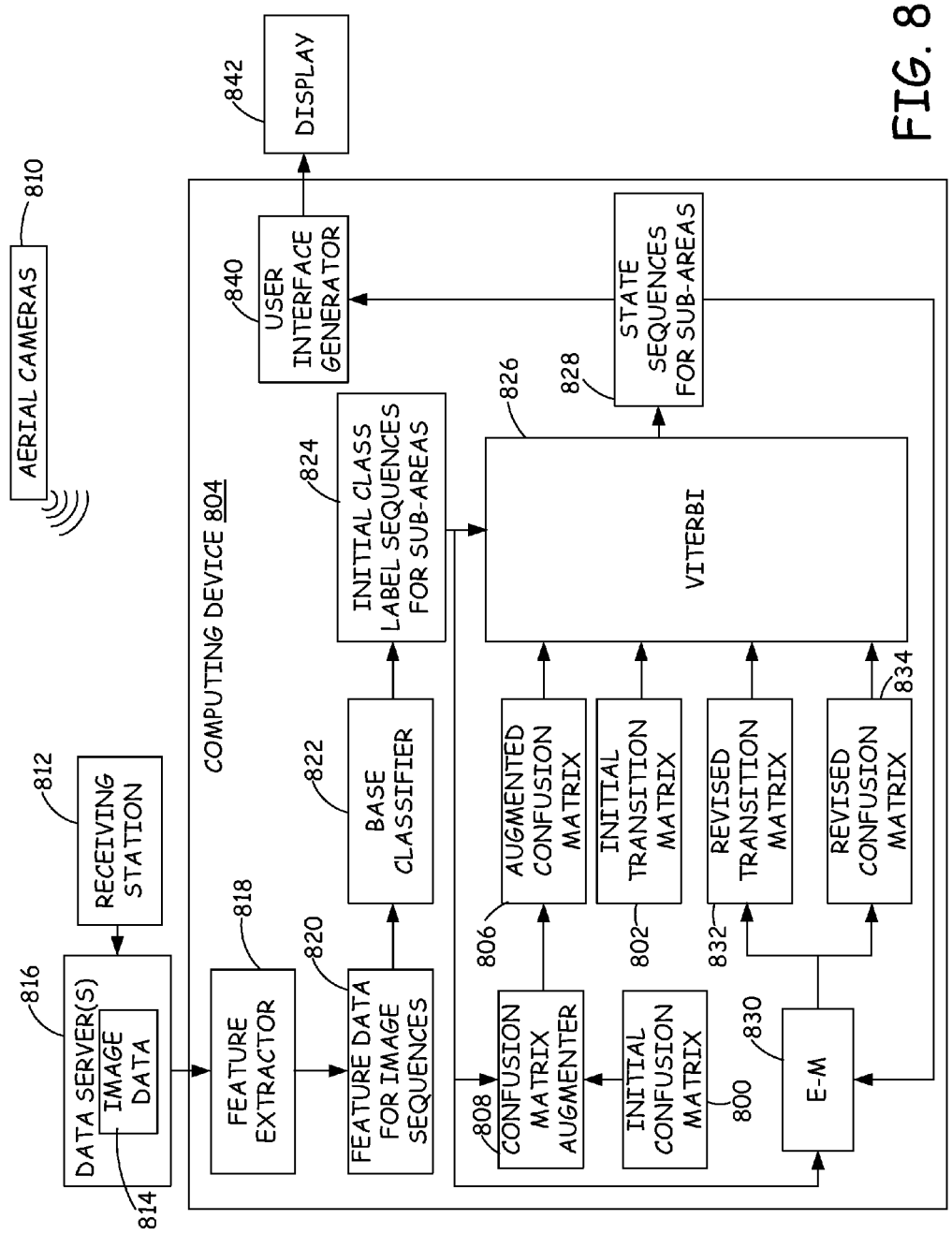
FIG. 8 is a block diagram of the elements used in the flow diagram of FIG. 7.
Figure 9:
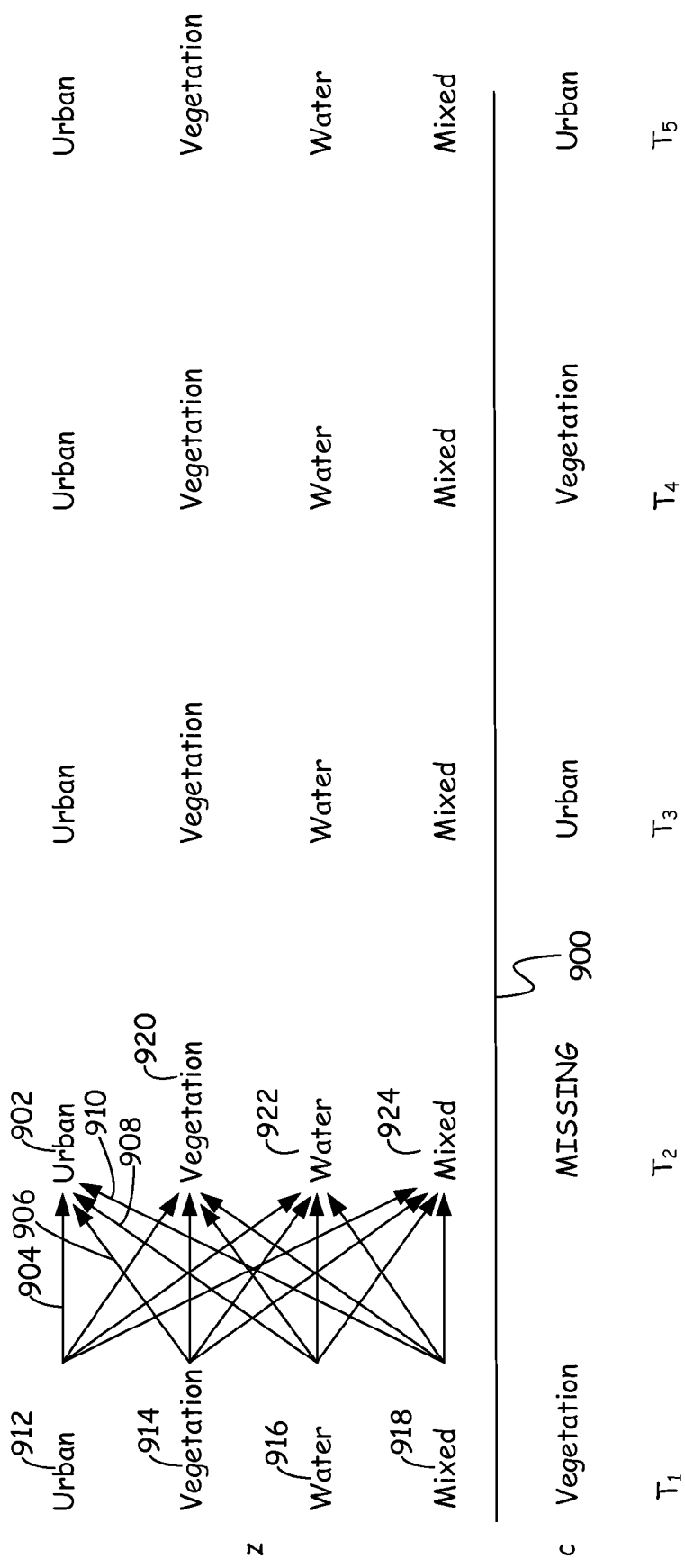
FIG. 9 is an example of execution of a Viterbi technique for a first two image capture times.

FIG. 7 provides a flow diagram of a method of identifying sequences of land cover states for multiple sub-areas using of a sequence of images of the sub-areas. FIG. 8 provides a block diagram of elements used in the method of FIG. 7.

At step 700, aerial cameras 810 capture sequences of temporally separated images of multiple areas on earth. The aerial cameras can include one or more sensors for each pixel and thus each pixel can be represented by a plurality of sensor values for each image captured by aerial cameras 810. The sensor data produced by aerial cameras 810 is sent to a receiving station 812, which stores the sensor data as image data 812 in data servers 816.

At step 702, a processor in a computing device 804 executes instructions to implement a feature extractor 818 that retrieves image data 814 from the memory of data servers 816 and identifies features from the image data 814 to produce feature data 820 for each pixel in each temporally separated image of the image sequences. Feature extractor 818 can form the feature data 820 by using the image data 814 directly or by applying one or more digital processes to image data 814 to alter the color balance, contrast, and brightness and to remove some noise from image data 814. Other digital image processes may also be applied when forming feature data 820. In addition, feature extractor 818 can extract features such that the resulting feature space enhances the partitioning of sub-areas into land cover classes.

At step 704, a processor in computing device 804 applies feature data 820 for the image sequences to a base classifier 822 to form initial class label sequences 824, where a separate class label sequences is provided for each sub-area in image data 814. In accordance with one embodiment, base classifier 822 is a classifier described in H. Taubenböck et al., Monitoring urbanization in mega cities from space, RSE, 2012, referred to below as DLRclass. DLRclass is an ensemble of binary decision trees; where each tree is trained for a different class using labeled training samples. Thus, a separate binary classifier is provided for each land cover class of water (W), urban (U), and vegetation (V). Each binary decision tree decides whether it is more likely that the features for the current pixel represents the tree's land cover class or does not represent the tree's land cover class. If none of the decision trees indicate that the features of a pixel represent their land cover class, the pixel is designated as being in the "Missing" class. The classes associated with the binary decision trees are ranked such that if a pixel is determined to be in more than one class by the classifiers, the pixel will be designated as being in the highest ranking of those classes.

In step 706 of FIG. 7, an initial confusion matrix 800 and an initial transition matrix 802 are received by computing device 804. Initial confusion matrix 800 and initial transition matrix 802 may be constructed manually by a domain expert and stored on computing device 804. In particular, initial confusion matrix 800 may be constructed based on class labels provided by the baseline classifier 822 for a set of images, the images themselves and additional information about the actual land cover of the areas depicted in the set of images. Using this information, the domain expert can estimate the true land cover of each sub-area in the images and from those estimates can calculate the probabilities of the various class labels given the true land covers. Initial transition matrix 802 can be constructed by collecting information about true land cover changes in various areas over time. The relative probability of each type of transition can then be determined. In general, the present inventors have identified that initial confusion matrix 800 should provide a higher probability for the proper class label being applied to a pixel than for an erroneous class label being applied to a pixel. Further, initial transition matrix 802 should provide a higher probability for a pixel remaining in a same land cover state between capture times rather than switching between land cover states.

FIG. 4 provides an example of an initial confusion matrix provided for class labels U, V, and W and land cover states U, V, W and "mixed", where U is for urban land cover, V is for vegetation land cover, W is for water land cover, and mixed is for two different types of land cover in the same pixel. Thus, in the confusion matrix of FIG. 4, there are more land cover states than there are land cover labels or classes. FIG. 6 provides an example of an initial transition matrix for transitioning between the four possible land cover states of urban, vegetation, water and mixed.

At step 708, initial confusion matrix 800 is augmented with a "missing" class. The "missing" class represents situations where the sensor data is insufficient to assign the pixel to one of the urban, water, or vegetation classes. For example, in FIG. 2, the data for sub-area 220 would be insufficient for classifying sub-area 220 in as urban, vegetation, or water because cloud 212 obscures the land cover from view. Noise in the sensor data can also cause a sub-area to be classified as "Missing."

In order to form augmented confusion matrix 806 at step 708, a processor of computing device 804 implements a confusion matrix augmenter 808 that examines initial class label sequences 824. In particular, confusion matrix augmenter 808 determines the percentage of pixels that have been assigned to the "Missing" class. Confusion matrix augmenter 808 then augments initial confusion matrix 800 with a column of probability values for the "Missing" label. In particular, a separate probability is provided for each land cover state: urban, vegetation, water, and mixed. Each of these probabilities represents the probability of the "missing" label given one of the land cover states. Confusion matrix augmenter 808 sets each of these probabilities to the percentage of pixel feature data that was labeled as missing by the base classifier. Thus, each of the possible land cover states has the same probability of generating the missing class. In addition, confusion matrix augmenter 808 reduces the probabilities in initial confusion matrix 800 by multiplying the probabilities in initial confusion matrix 800 by one minus the percentage of pixels that were assigned to the missing class. This ensures that for any given land cover state in the confusion matrix, the sum of the probabilities of the class labels U, V, W and "Missing" is equal to one. FIG. 5 provides an example of the augmented confusion matrix.

At step 710, a processor of computing device 804 selects one of the areas captured in image data 814 and at step 712, the processor selects a sub-area in the selected area along with its associated class label sequence in initial class label sequences 824. At step 714, a processor in computing device 804 implements a Viterbi algorithm 826 that is used to identify a most likely sequence of land cover states from the initial class label sequence the confusion matrix and the transition matrix. FIGS. 9-12 provide an example of a directed graph showing an implementation of Viterbi algorithm 826. In FIGS. 9-12, a column is provided for each of a set of image capture times $T_1$, $T_2$, $T_3$, $T_4$ and $T_5$. The capture times represent the times when aerial cameras 810 capture image data and reflect the order of the captured image data such that the image data captured at time $T_2$ was captured after the image data captured at time $T_1$ and the image data captured at time $T_3$ was captured after the image data captured at time $T_2$, and so forth. Thus, $T_5$ represents the last image data that was captured and $T_1$ represents the first image data that was captured. In each column, a class label assigned to the image data in class label sequences 824 is shown below a horizontal line 900 while possible land cover states at the capture time are shown above horizontal line 900. Thus, the class label sequence classifies the pixel at time $T_1$ as Vegetation; the pixel at time $T_2$ as "Missing"; the pixel at time $T_3$ as Urban; the pixel at time $T_4$ as Vegetation; and the pixel at time $T_5$ as Urban. At each capture time, the available land cover states are shown as Urban, Vegetation, Water and Mixed.

The Viterbi algorithm begins by determining an initial score for each land cover state at time $T_1$. In accordance with one embodiment, the score for each land cover state at time $T_1$ is determined based on the augmented confusion matrix and the class assigned to the pixel at time $T_1$. In particular, the score for a land cover state is equal to the probability of the class label at time $T_1$ given the land cover state as defined in the confusion matrix. Thus, the initial score for the land cover state is the probability that the land cover state would generate the classification produced by the base classifier for the pixel at time $T_1$.

Figure 10:
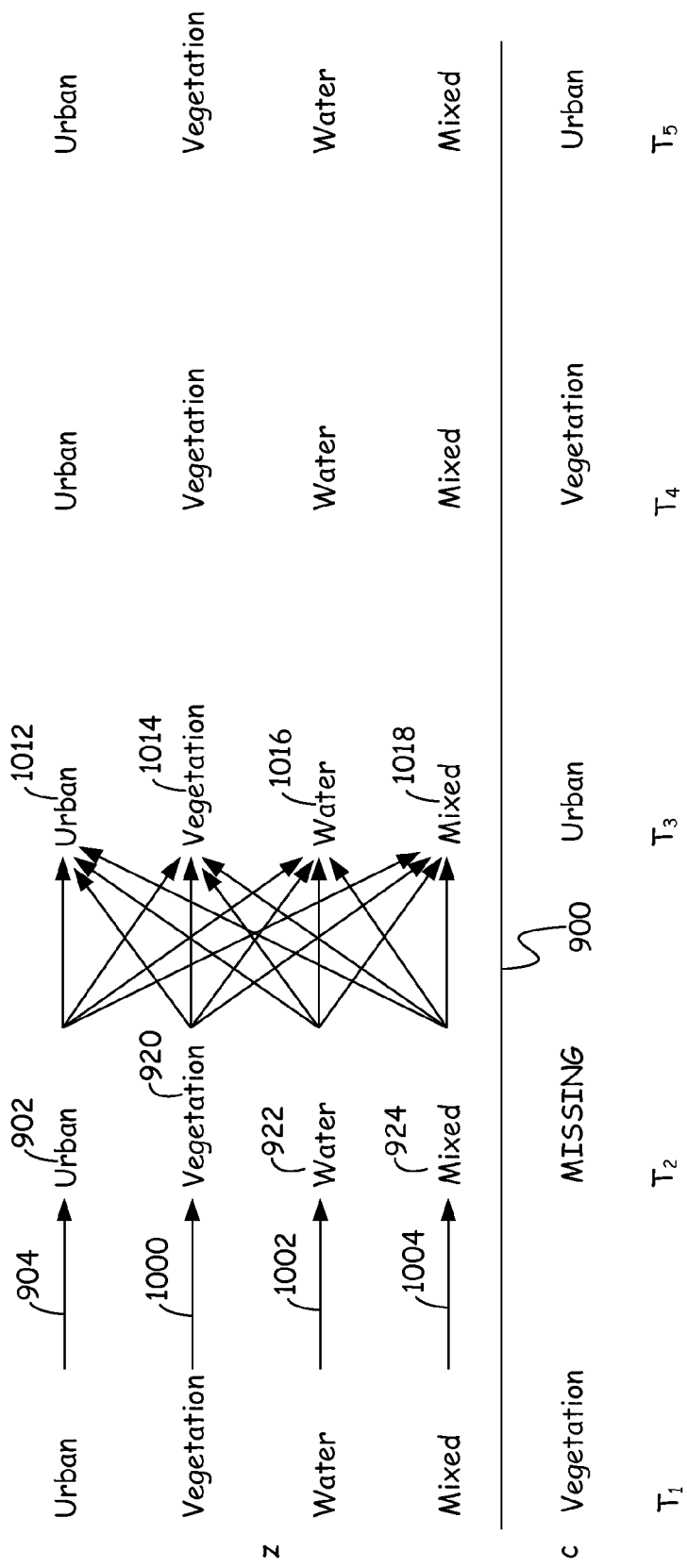
FIG. 10 is an example of execution of a Viterbi technique for a third image capture time.

Next, the Viterbi algorithm determines the most likely path into each of the land cover states for the next time $T_2$ from the existing land cover states at time $T_1$. The likelihood of a path into a state at time $T_2$ is equal to the score of the preceding land cover state times the transition probability for transitioning from the preceding land cover state to the land cover state of time $T_2$. For example, for Urban land cover state 902, there are four possible paths into the state at time $T_2$. Those paths include path 904 from Urban land cover state 912 at time $T_1$, path 906 from Vegetation land cover state 914 at time $T_1$, path 908 from Water land cover state 916 at time $T_1$ and path 910 from mixed land cover state 918 at time $T_1$. The probability of entering Urban land cover state 902 at time $T_2$ along path 904 is equal to the score of urban state 912 at time $T_1$ times the probability of transitioning from Urban state 912 to Urban state 902 between time $T_1$ and $T_2$. As noted previously, the score for urban state 912 is the confusion matrix probability $P(c_t^i=V|z_t^i=U)$. The probability of transitioning from urban state 912 to urban state 902 is provided by initial transition matrix 802. In particular, it is the probability $P(z_t^i=U|z_{t-1}^i=U)$. Thus, the total score for path 904 is $P(c_t^i=V|z_t^i=U) \cdot P(z_t^i=U|z_{t-1}^i=U)$. Similar scores can be determined for each of Vegetation state 914, Water state 916 and Mixed state 918. The path that provides the highest path score into state 902 is then selected. This process is repeated for each of the land cover states 902, 920, 922, and 924 at time $T_2$ and results in selected paths 904, 1000, 1002 and 1004 as shown in FIG. 10 for the states 902, 920, 922 and 924.

After the paths have been selected into each of the land cover states at time $T_2$ the score for each of the land cover states is updated by multiplying the selected path score by the confusion matrix probability for the land cover state at time $T_2$. For example, the confusion matrix probability of $P(c_t^i=\text{missing}|z_t^i=U)$ is multiplied by the path score for path 904 to form the state score for state 902 at time $T_2$. The state score will then be used in the next iteration of the Viterbi algorithm to identify the most likely paths into the next set of states 1012, 1014, 1016 and 1018 at time $T_2$. In terms of an equation, the state scores are sequentially calculated as:

$$\alpha_t^j = m_{yj} \max_k [\alpha_{t-1}^k \cdot P(z_t^i=j|z_{t-1}^i=k)] \qquad \text{EQ.1}$$

where j is the land cover state at time t, k is the land cover state at time t−1 that provides the largest path score into land cover state j at time t, y is the class label assigned to the pixel at time t and $m_{yj}$ is the confusion probability for class label y given land cover state j at time t.

Figure 11:
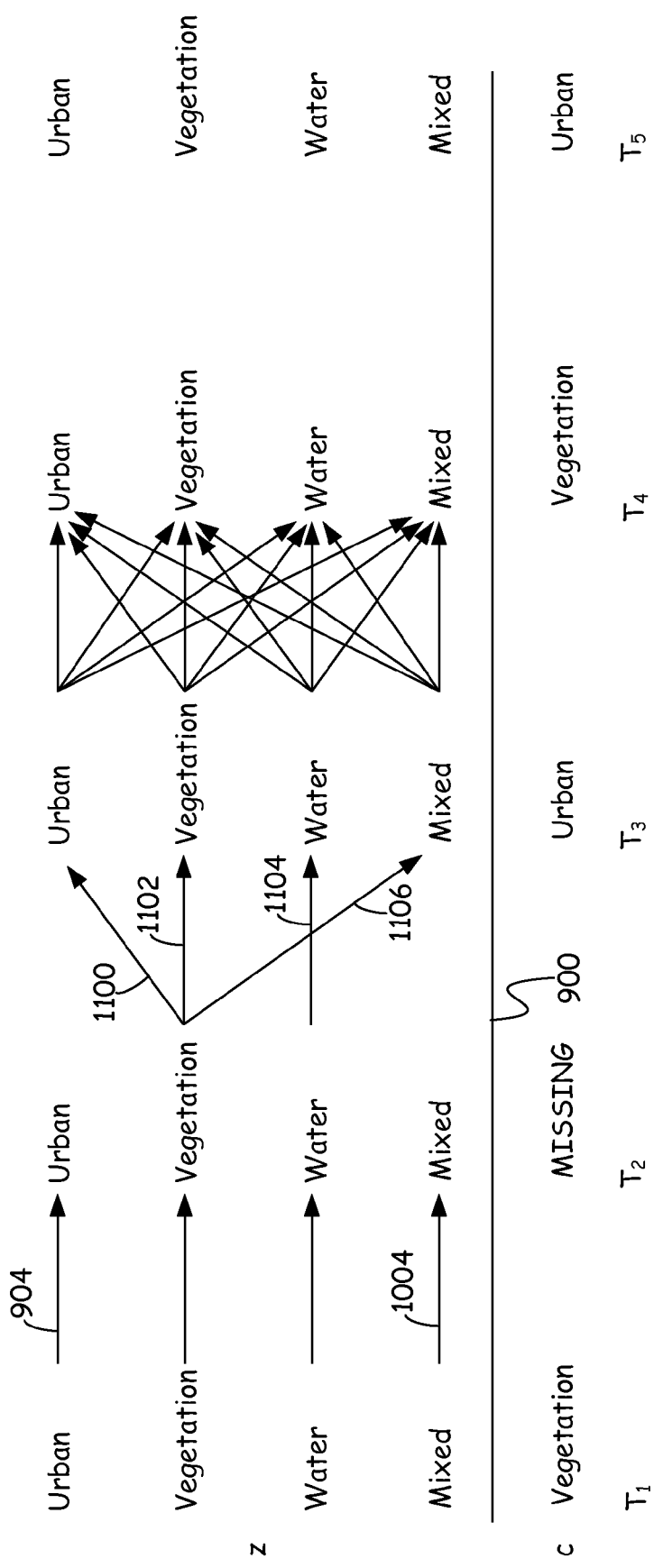
FIG. 11 is an example of execution of a Viterbi technique for a fourth image capture time.
Figure 12:
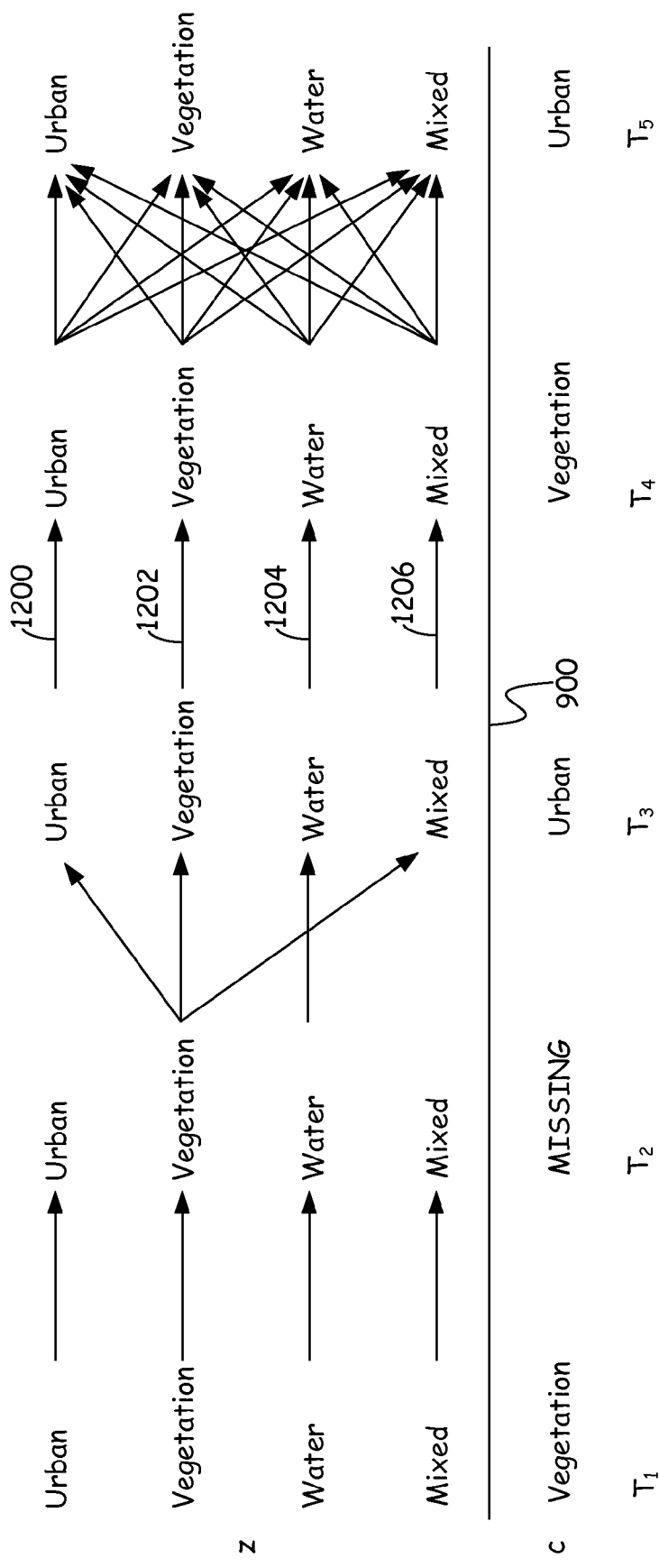
FIG. 12 is an example of execution of a Viterbi technique for a fifth image capture time.
Figure 13:
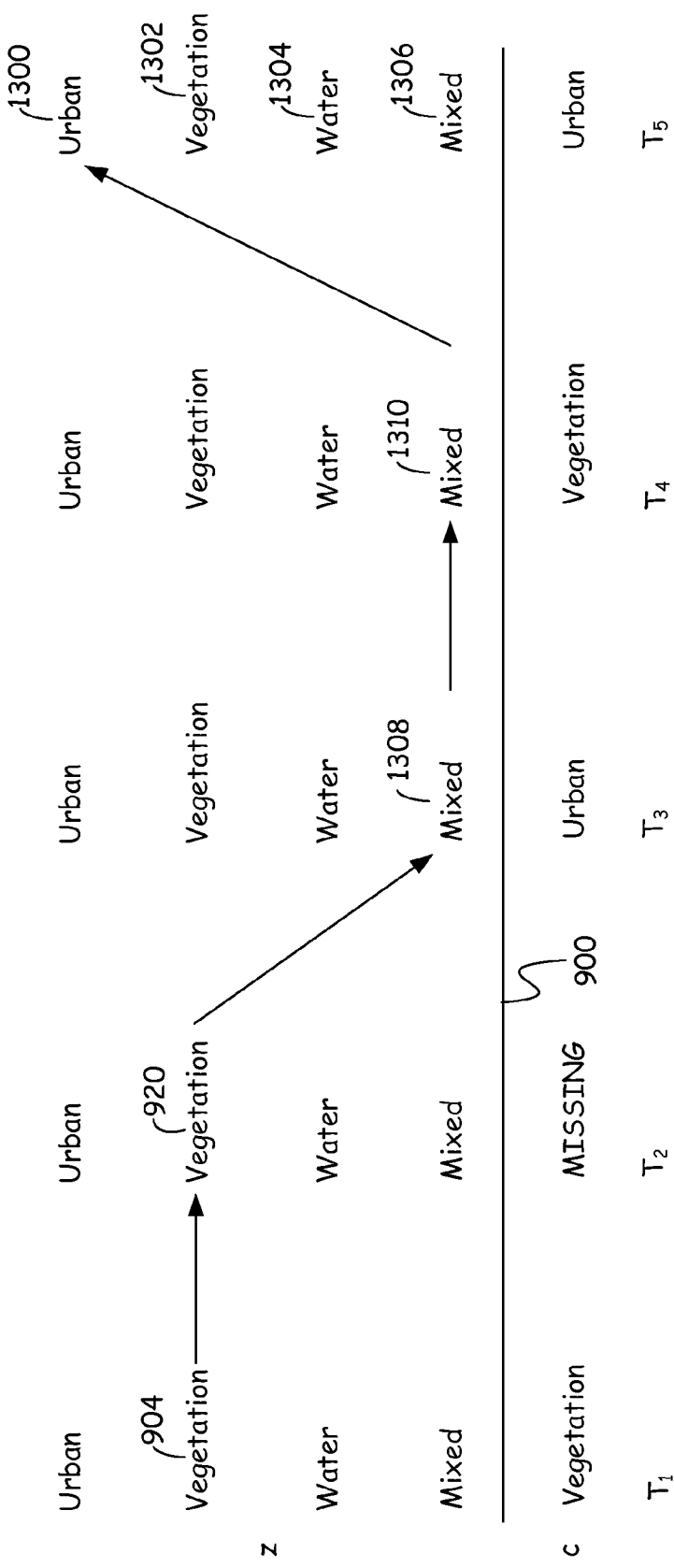
FIG. 13 is an example showing the final path selected by a Viterbi technique.

FIGS. 11-13 show the remaining progression of the Viterbi algorithm. In FIG. 11, paths 1100, 1102, 1104 and 1106 are selected for the transition between time $T_2$ and time $T_3$. Note that paths 904 and 1004 end at this transition and may be pruned from further consideration. In FIG. 12, paths 1200, 1202, 1204 and 1206 are selected for the transition between time $T_3$ and time $T_4$. When Viterbi algorithm 826 reaches the last capture time $T_5$, the scores for each of the states 1300, 1302, 1304 and 1306 are compared to each other and the state with the highest score is selected as the final state. The selection of this final state results in the selection of a complete path through the states as shown in FIG. 13 and thus the most likely state sequence. In this context, the most likely state sequence is the state sequence that is more likely than all other possible state sequences.

In particular, as shown in FIG. 13, the selected path includes land cover states 904, 920, 1308, 1310 and 1300. At time $T_1$, the base classifier is deemed to have correctly classified the land cover as vegetation as indicated by the selection of vegetation land cover state 904. At time $T_2$, the classifier was unable to classify the land cover because of missing data. However, Viterbi algorithm 826 is able to identify a land cover state 920 of vegetation based in part on the likelihood of transitioning between various land cover states. At capture time $T_3$, although the base line classifier identified the pixel as Urban land cover, Viterbi algorithm 826 has identified Mixed land cover state 1308 for the sub-area. Note that the classifier is unable to classify a pixel as a Mixed class since that class does not exist in the classifier and there is no training data provided for that class. Thus, even without training data for a mixed class in the classifier, embodiments described herein are able to identify a Mixed land cover state for a sub-area. This is in contrast with spectral unmixing approaches that identify the proportion of different land cover classes in a given sub-area (pixel). The spectral unmixing approaches would however need labeled examples for learning the coefficients. At capture time $T_4$, the classifier identified the pixel as Vegetation but Viterbi algorithm 826 has instead identified the land cover state as once again being Mixed. At capture time $T_5$, the classifier classified the pixel as being Urban once again and Viterbi algorithm 826 is in agreement and has assigned Urban land cover state 1300 to the sub-area.

Viterbi algorithm 826 stores the most-likely sequence of states as one of state sequences for sub-areas 828.

At step 716, the processor determines if there are more sub-areas in the selected area. If there are more sub-areas, the processor returns to step 712 to select a different sub-area and its associated class label sequence. Step 714 is then performed for the newly selected sub-area and class label sequence. When all the sub-areas for a currently selected area have been processed through step 714, the processor continues at step 718 where it determines if there are more areas for which a sequence of image data has been captured. If there are more areas, a new area is selected at step 710 and steps 712, 714 and 716 are performed for the new area. When all the areas have been processed at step 718, state sequences 828 and initial class label sequences 824 are used to update the confusion matrix and the transition matrix at step 720.

In accordance with one embodiment, updating the confusion matrix and the transition matrix is performed using an expectation-maximization (E-M) algorithm 830 executed by a processor on computing device 804. E-M algorithm 830 first updates the confusion matrix to maximize the probabilities of initial class label sequences 824 given state sequences 828 then updates the transition matrix to maximize the probability of the state sequences 828. E-M algorithm 830 produces revised transition matrix 832 and revised confusion matrix 834.

At step 722, the transition matrix and the confusion matrix are examined by the processor to see if they are stable such that they are no longer changing substantially between iterations of identifying the state sequences and training the transition and confusion matrices. If one or both of the matrices is not stable, the processor returns to step 710 to select the first area once again and steps 712, 714, 716, 718 and 720 are repeated. When repeating steps 712 and 714, new state sequences 828 are constructed based on the revised transition matrix 832 and the revised confusion matrix 834. When the confusion matrix and transition matrix are stable, the process ends at step 724 with the state sequences 828 representing the final state sequences.

Steps 720 and 722 are not necessary once the revised transition matrix and revised confusion matrix are stable. Thus, after an initial training, the revised transition matrix and revised confusion matrix can be used in identifying state sequences for sub-areas in additional image sequences without needing to use E-M algorithm 830 further.

The final state sequences 828 for the sub-areas can be used to identify a current land cover state for each sub-area. This involves looking at the state for the sub-area at the final capture time in state sequences 828 for that sub-area.

Note that improvements provided by embodiments described herein can be seen in FIG. 13. With a baseline classifier, the pixel is shown as going from Vegetation to Missing to Urban then back to Vegetation and then back to Urban. Thus, the sub-area appears to be oscillating between possible land covers. Given that land cover seldom changes, the changes described by the baseline classifier are suspect. However, the sequence of land cover states provided by Viterbi algorithm 826 is much more stable indicating that the sub-area is in the Vegetation state for both times $T_1$ and $T_2$, then transitions to a mixed state at times $T_3$ and $T_4$, before becoming a fully urban state at time $T_5$. This seems like a much more likely sequence of states for a sub-area that begins in a Vegetation state and ends in an Urban state.

Figure 14:
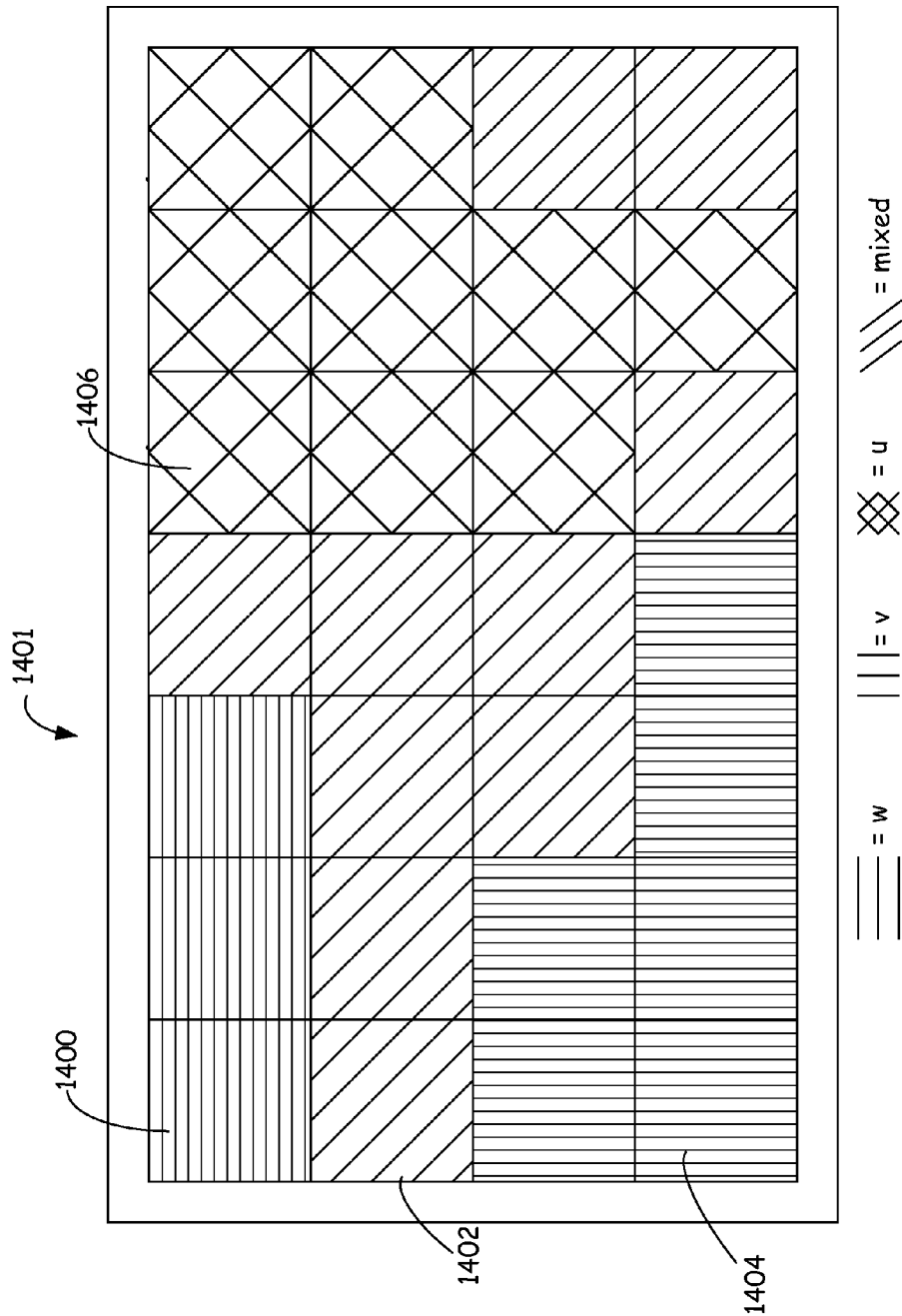
FIG. 14 is an example of a color-coded user interface showing sub-areas colored to indicate the land cover states detected using embodiments herein.

Final state sequences 828 for the sub-areas can also be used by a user interface generator 840 implemented by a processor to generate a user interface on a display 842. In accordance with one embodiment, the user interface produced by user interface generator 840 comprises a color-coded image indicating the land cover state of each sub-area. FIG. 14 provides an example of such a user interface 1401 for the image of FIG. 3. In FIG. 14, crosshatching is used to represent colors that would be displayed to represent the land cover state of each sub-area. For example, the hatching of sub-area 1400 indicates a color used to designate Water land cover, the hatching of sub-area 1402 indicates a color used to designate Mixed land cover, the hatching of sub-area 1404 indicates a color to designate Vegetation land cover and the hatching of sub-area 1406 indicates a color used to designate Urban land cover. Using the color coding of FIG. 14, the land cover state of each sub-area in an image can be quickly conveyed to the user through the user interface on display 842. Alternatively, user interface generator 840 may generator statistics indicating the number or percentage of each land cover state in each image or across multiple image areas. These statistics can be displayed to the user through a user interface on display 842.

In a further embodiment, a user interface is produced that shows which sub-areas of an area changed between a first land cover state at a first time and a second land cover state at a second time. A method for generating such a user interface is shown in FIG. 15 and utilizes the elements shown in the block diagram of FIG. 16.

Figure 15:
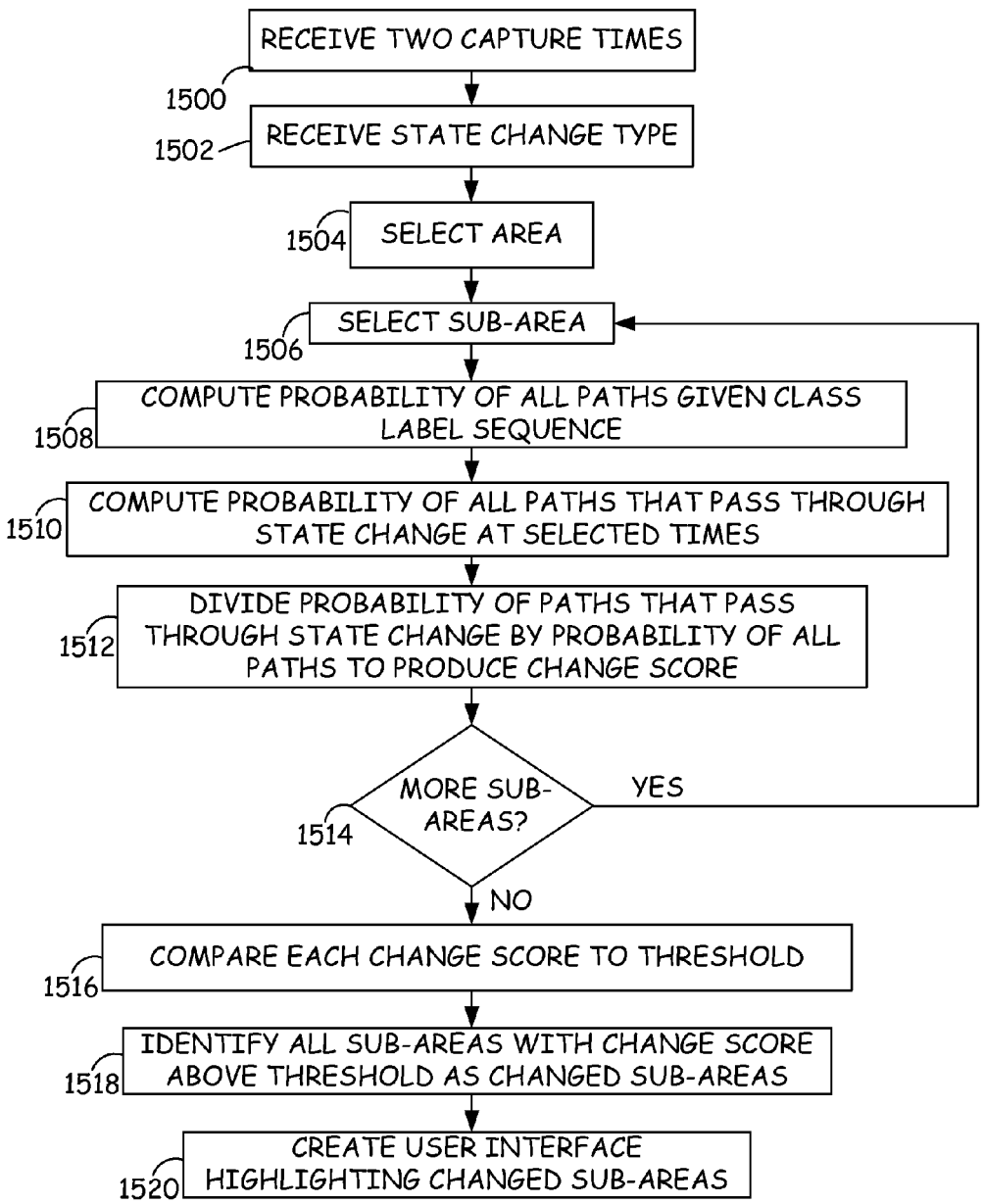
FIG. 15 is a flow diagram of a method of determining a change score for each sub-area.
Figure 16:
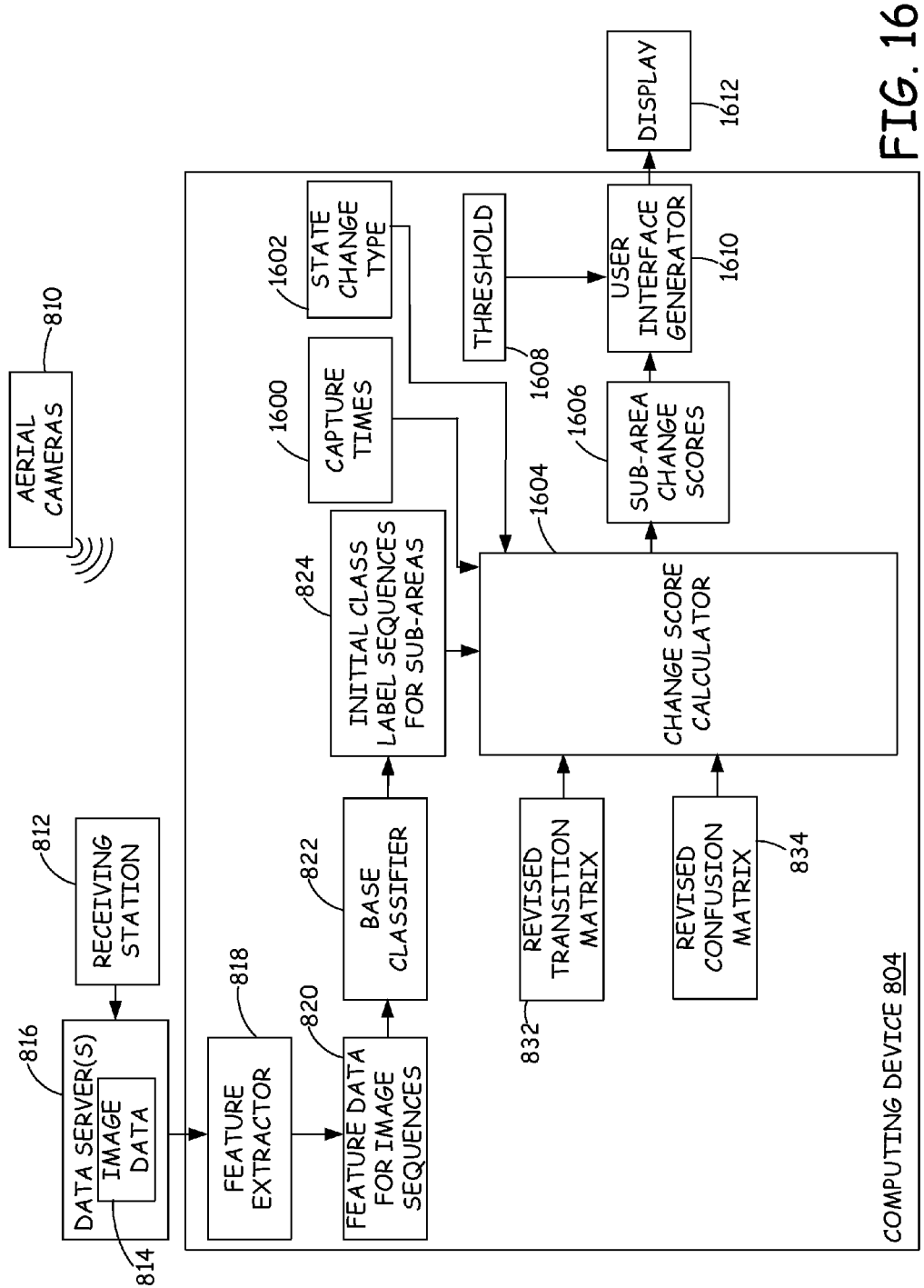
FIG. 16 is a block diagram of elements used in the flow diagram of FIG. 15.

The method of FIG. 15 uses the initial class label sequences for pixels 824 created through steps 700, 702 and 704 of FIG. 7. Thus, the process utilizes aerial cameras 810, receiving station 812, data servers 816, which hold image data 814, and computing device 804, which executes feature extractor 818 to produce feature data 820 and base classifier 822 to produce initial class label sequences 824. In addition, the method of FIG. 15 uses revised transition matrix 832 and revised confusion matrix 834 produced in step 720 of FIG. 7.

At step 1500, two capture times 1600 are received. Capture time 1600 may be received through a user interface from a user or may be retrieved from either a local memory on computing device 804 or a remote memory accessed by computing device 804 through a network. Capture times 1600 includes a first capture time and a second capture time representing times when images of an area were captured.

At step 1502, a state change type 1602 is received. State change type 1602 may be received through a user interface from the user or may be retrieved from a local memory on computing device 804 or from a remote memory accessed by computing device 804 through a network. State change type 1602 indicates a first land cover state at a first time for a sub-area and second land cover state at a later time for the sub-area. For example, a state change type of Urban-to-Water indicates that the pixel had a land cover state of Urban at a first time but then changed to a land cover state of Water at a later time. The possible land cover state change types include Vegetation-Water, Vegetation-Urban, Vegetation-Mixed, Water-Vegetation, Water-Urban, Water-Mixed, Urban-Vegetation, Urban-Water, Urban-Mixed, Mixed-Vegetation, Mixed-Water and Mixed-Urban, in accordance with some embodiments.

Figure 17:
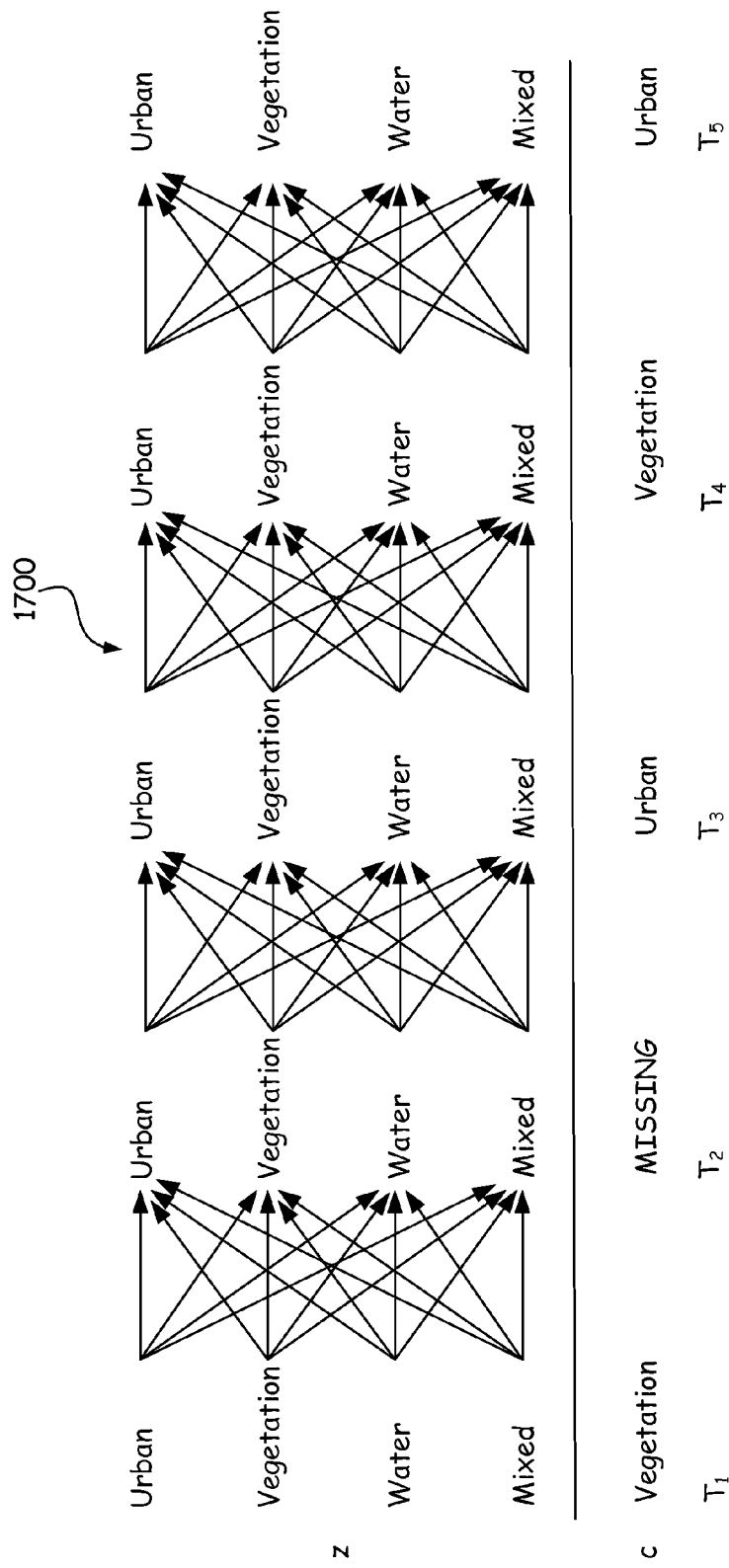
FIG. 17 is an example of a trellis used to determine a probability of all land cover state paths.

After receiving capture times 1600 and state change type 1602, a change score calculator 1604 implemented by a processor on computing device 804 selects an area at step 1504. The area selected at step 1504 typically represents an area captured in a sequence of images. At step 1506, a sub-area within the selected area is selected. At step 1508, change score calculator 1604 determines the probability of all possible land cover state sequences given the initial class label sequences 824. FIG. 17 provides an example of all possible land cover sequences given a class label sequence. In FIG. 17, a trellis 1700 is shown that includes land cover states at various capture times $T_1$-$T_5$ and paths between each land cover state at each capture time. Computing the probability of all sequences of land cover states thus involves determining the probability of all paths through trellis 1700. The probability of all paths through trellis 1700 can be computed by recursively determining probabilities for each land cover state at each time point T as:

$$\alpha_t^j = m_{j,c_t} \cdot \sum_{i=1}^{k} \alpha_{t-1}^i \cdot x_{i,j}$$

where $$\alpha_1^i = m_{i,c_1},$$

and where $m_{i,c_1}$ is the confusion probability for the first class label in the initial class label sequence given the ith land cover state, $m_{j,c_t}$ is the confusion probability of the class label at time t given a land cover state j, $x_{i,j}$ is the transition probability for transitioning between land cover state i at time t−1 to land cover state j at time t, k is the number of land cover states, $\alpha_t^j$ is the score for the jth land cover state at time t, and $\alpha_1^i$ is the score for the ith land cover state at time t=1. When the final capture time T is reached, the scores for each land cover state are summed together to form the score for all of the paths, which is described as:

$$\text{Allpath} = \sum_{j=1}^{k} \alpha_T^j$$

Figure 18:
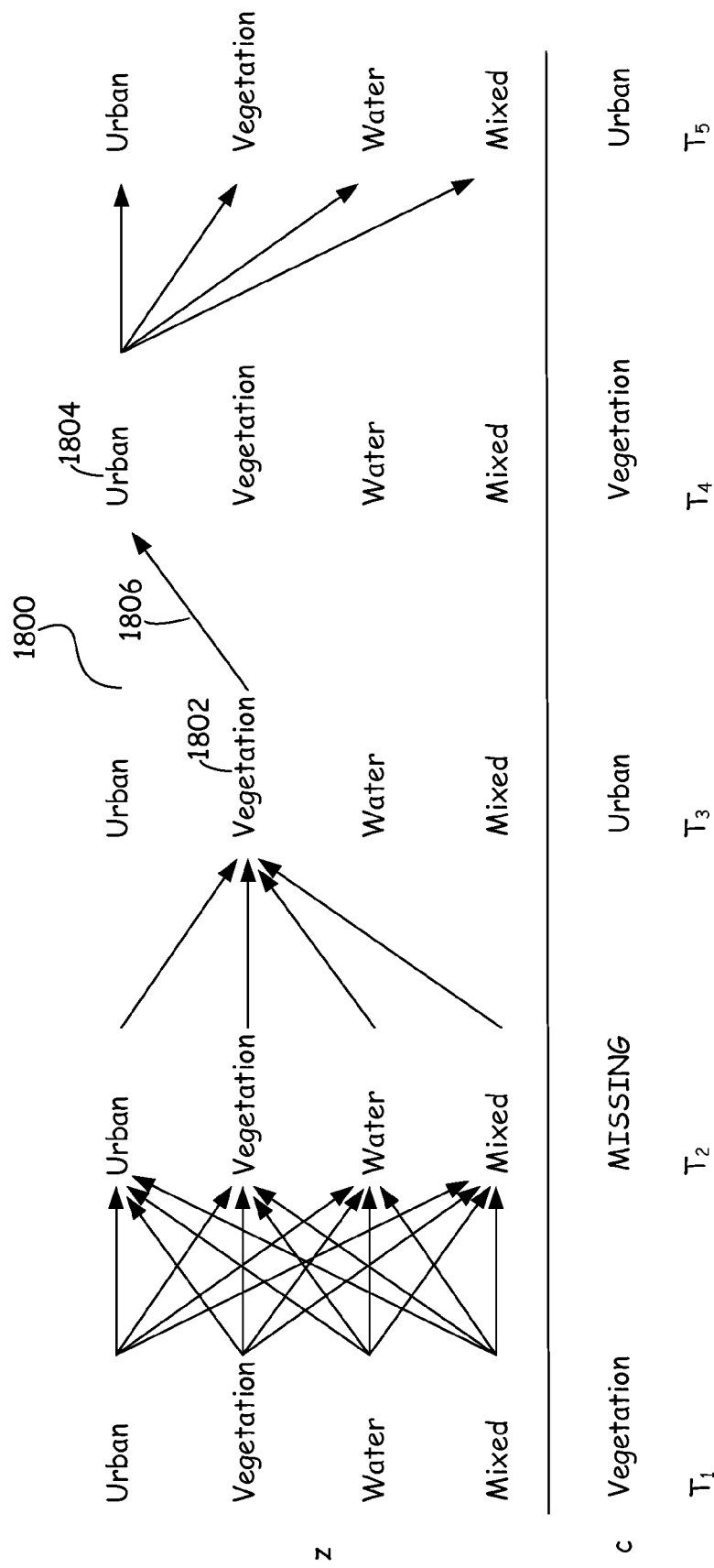
FIG. 18 is an example of a trellis used to determine a probability of all land cover state paths that pass over a transition between two land cover states at two selected times.

At step 1510, change score calculator 1604 computes the probability of all paths that pass through the state change type 1602 at the capture times 1600. FIG. 18 provides an example of a trellis 1800 of such paths that all pass through a change from vegetation land cover state 802 at time $T_3$ to Urban land cover state 804 at time $T_4$ along a transition 1806. In accordance with one embodiment, the probability of all paths that pass through a land cover state change from state $S_1$ at time $t_{S_1}$ to state $S_2$ at time $t_{S_2}$ is computed as:

$$\text{For } t = t_1 \text{ to } t_{S_1}: \quad \alpha_t^j = m_{j,c_t} \cdot \sum_{i=1}^{k} \alpha_{t-1}^i \cdot x_{i,j}$$

$$\text{For } t_{S_1}: \quad \alpha_{t_{S_1}}^{j \neq S_1} = 0, \quad \alpha_{t_{S_1}}^{j=S_1} = m_{S_1,c_{t_{S_1}}} \cdot \sum_{i=1}^{k} \alpha_{t_{S_1}-1}^i \cdot x_{i,j}$$

$$\text{For } t_{S_2}: \quad \alpha_{t_{S_2}}^{j \neq S_2} = 0, \quad \alpha_{t_{S_2}}^{j=S_2} = m_{S_2,c_{t_{S_2}}} \cdot \alpha_{t_{S_1}}^{S_1} \cdot x_{S_1,S_2}$$

$$\text{For } t = t_{S_2} \text{ to } T: \quad \alpha_t^j = m_{j,c_t} \cdot \sum_{i=1}^{k} \alpha_{t-1}^i \cdot x_{i,j}$$

where $\alpha_1^i = m_{i,c_1}$, and where $m_{i,c_1}$ is the confusion probability for the first class label in the initial class label sequence given the ith land cover state, T is the total number of capture times, $m_{j,c_t}$ is the confusion probability of the class label at time t given a land cover state j, $$m_{S_1,c_{t_{S_1}}}$$

is the confusion probability of the class label at time $t_{S_1}$ given a land cover state $S_1$, $$m_{S_2,c_{t_{S_2}}}$$

is the confusion probability of the class label at time $t_{S_2}$ given a land cover state $S_2$, $x_{i,j}$ is the transition probability for transitioning between land cover state i at time t−1 to land cover state j at time t, $x_{S_1,S_2}$ is the transition probability for transitioning between land cover state $S_1$ and land cover state $S_2$, $\alpha_t^j$ is the score for the jth land cover state at time t, $\alpha_1^i$ is the score for the ith land cover state at time t=1, $$\alpha_{t_{S_1}}^{j=S_1}$$

is the score for land cover state $S_1$ at time $t_{S_1}$, $$\alpha_{t_{S_1}}^{j \neq S_1}$$

is the score for all land cover states that are not $S_1$ at time $t_{S_1}$, $$\alpha_{t_{S_2}}^{j=S_2}$$

is the score for land cover state $S_2$ at time $t_{S_2}$, $$\alpha_{t_{S_2}}^{j \neq S_2}$$

is the score for all land cover states that are not $S_2$ at time $t_{S_2}$, and k is the number of land cover states.

At step 1512, change score calculator 1604 divides the probability of paths that pass through state change type 1602 at capture times 1600 by the probability of all paths to produce a change score. Thus, the probability computed in step 1510 is divided by the probability computed in step 1508 at step 1512. The resulting change score is stored in memory as sub-area change scores 1606.

At step 1514, if there are more sub-areas, a next sub-area is selected by returning to step 1506 and steps 1508, 1510 and 1512 are repeated for the new sub-area. When all the sub-areas of the selected area have been processed at step 1514, change score calculator 1604 outputs a list of sub-area changed scores 1606. Note that every sub-area of the selected area will have a changed score, however, those sub-areas that did not experience state change type 1602 at capture times 1600 will have a low change score.

At step 1516, each of the changed scores 1606 is compared to a threshold 1608 by a user interface generator 1610. User interface generator 1610 identifies all sub-areas with change scores above the threshold at step 1518 and constructs a user interface to highlight the sub-areas that have a change score that exceeds the threshold at step 1520. The resulting user interface is then displayed on display 1612.

Figure 19:
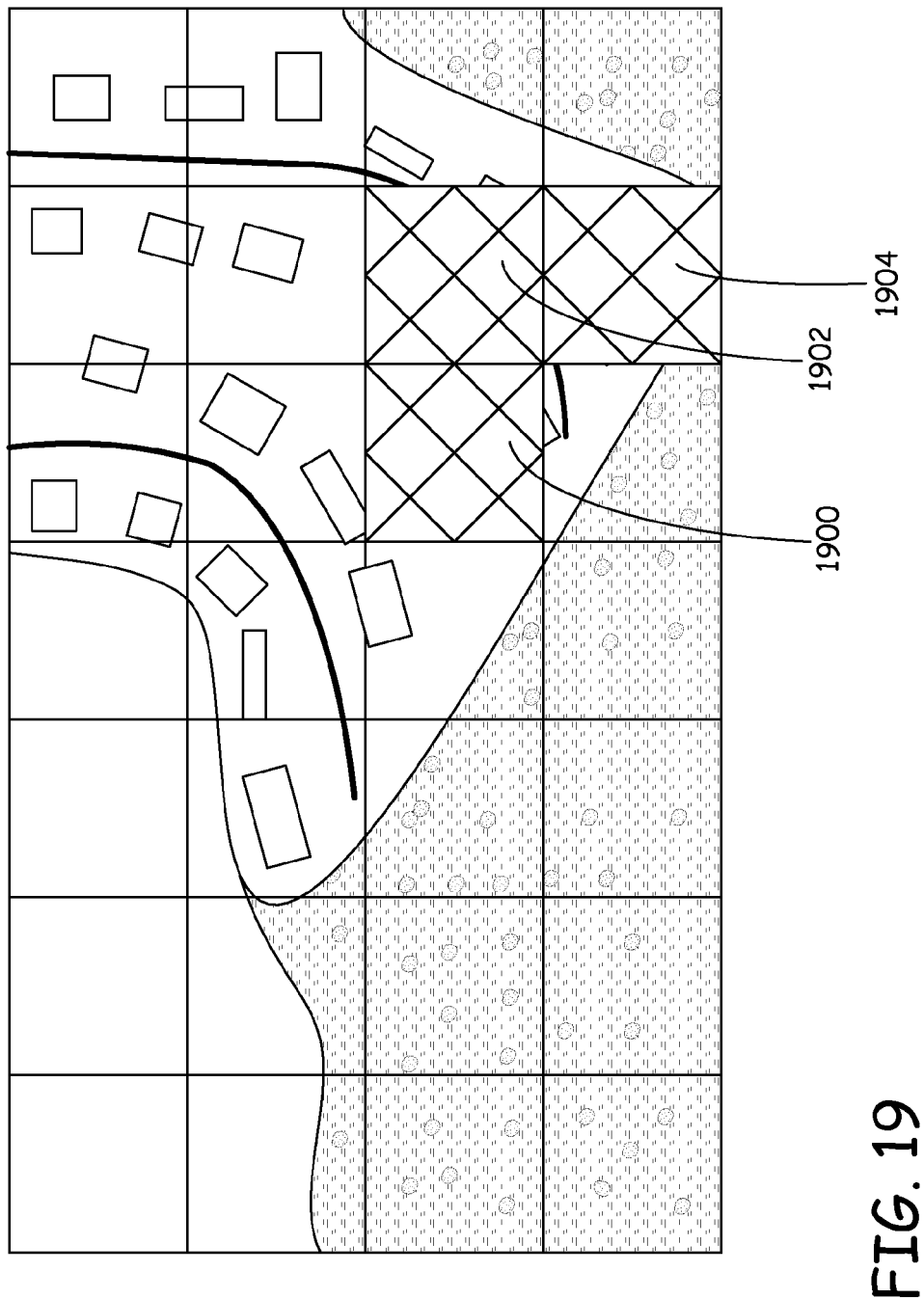
FIG. 19 is an example of a user interface showing sub-areas with change scores that exceed a threshold.

FIG. 19 provides an example of a user interface showing sub-areas that have changed from Vegetation to Urban between times $T_3$ and $T_4$ of FIG. 18. In FIG. 19, three sub-areas 1900, 1902 and 1904 have been colored, as indicated by cross-hatching, to show that the sub-area changed from Vegetation to Urban between times $T_3$ and $T_4$. As shown in FIG. 19, the coloring obscures an image of the sub-area while the images of sub-areas that did not change are shown without coloring. In other embodiments, sub-areas that do not experience the change in land cover at the designated times are colored differently from the sub-areas that experienced a change in land cover type at the designated times.

An experiment was conducted to determine the effectiveness of the embodiments described above. The data consisted of two multi-spectral Landsat images one month apart (August and September 2008) for the city of Belo Horizonte. Each sub-area of the two images is assigned a label from the target classes (W, V or U) by a DLRclass classifier.

First, a scheme of bi-temporal post-classification comparison was used to identify sub-areas that have different class labels. This involves comparing the class label applied to a sub-area in September to the class label applied to the sub-area in August and counting how many of the sub-areas had their class label change between the two months. In one experiment, 9.5% of the sub-areas changed their class in a period of one month using the baseline classifier. However, land cover change is a relatively rare event (across large spatial areas) and one expects the annual rate of land cover change to be under 1%. Thus, it is reasonable to consider these 9.5% sub-areas with land cover change to be spurious due to classification errors.

The label sequences from the DLRclass classifier that were used to determine that 9.5% of the sub-areas changed state were then applied to the techniques described above to form state sequences. As described above, the state for a sub-area may be different from its label in the original classification. The state sequences were then examined to determine which sub-areas had state changes between August and September and it was found that only 1.65% of the sub-areas changed state. Since 1.65% is closer to the expected percentage of land cover changes, it is concluded that the embodiments described above provide a more accurate indication of land cover states over time.

The ability to monitor the extent and rate of urbanization in a timely fashion is critical due to its far-reaching consequences for the regional environment and beyond. Current state-of-the-art methods use bi-temporal post-classification comparison for change detection, which can have very low precision (especially for sub-decadal time scales) due to classification inaccuracy. In the embodiments described above, a HMM-based generative model for land cover label sequences is used to generate more accurate land cover state sequences and to generate user interfaces showing land cover states at particular times and changes between land cover states at selected times. Systematic empirical evaluation results on real and synthetic data showed that significant improvements in classification accuracy and change detection precision are achieved using the proposed framework for mapping land cover states. Furthermore, the probabilistic model provides useful statistics, namely the change scores, which can be leveraged while analyzing change detection queries.

Figure 20:
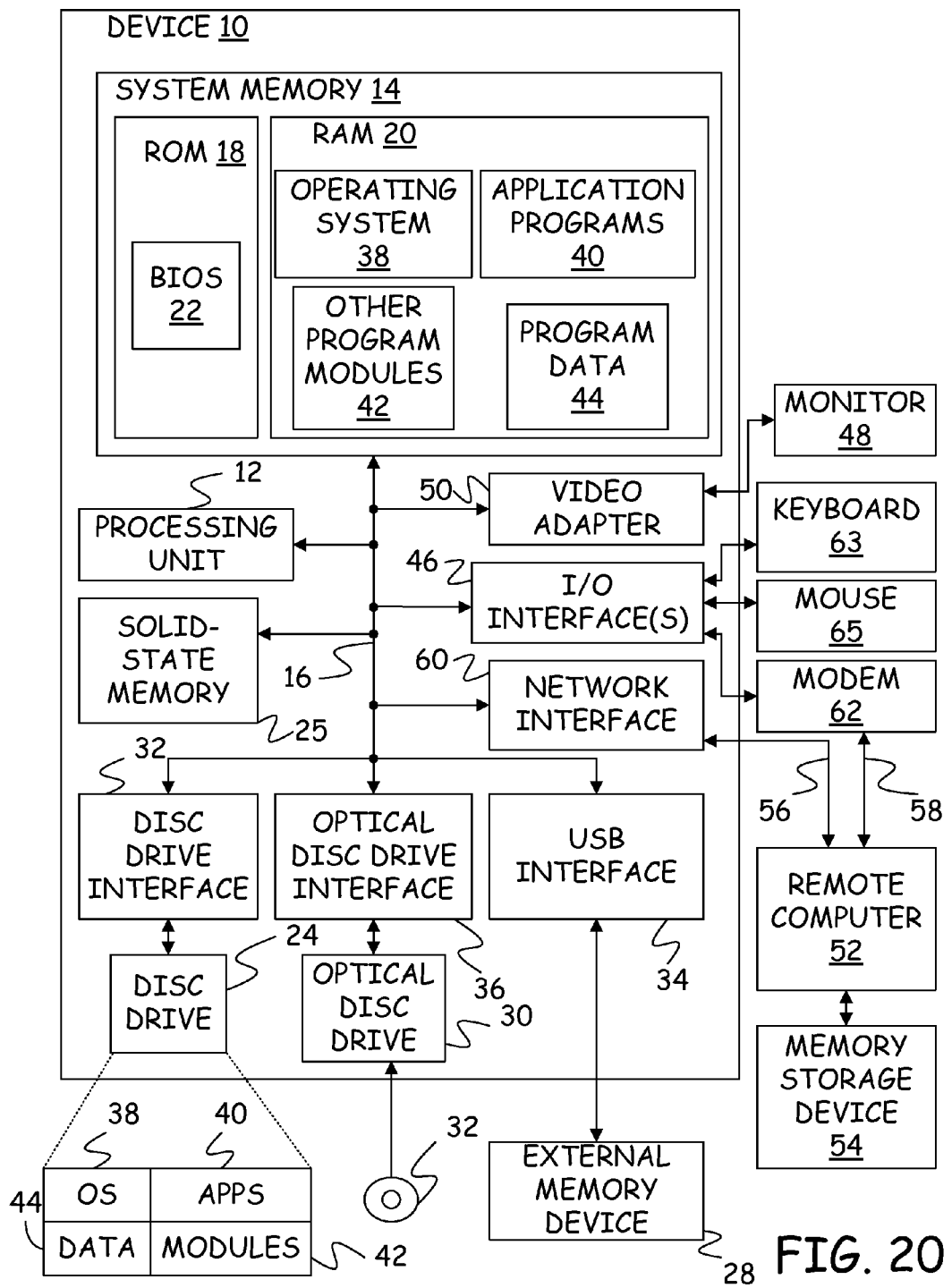
FIG. 20 shows a computing device that can be used with embodiments described herein.

An example of a computing device that can be used as computing device 804, data server 816, and receiving station 812 in the various embodiments is shown in the block diagram of FIG. 20. The computing device 10 of FIG. 20 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable storage media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above including feature extraction, baseline classification, Viterbi path selection, expectation-maximization, change score calculator and user interface generation. Program data 44 may include image data, feature data, class label sequences, initial confusion matrix, initial transition matrix, revised transition matrix, revised confusion matrix, capture times, state change type, sub-area change scores, sub-area state sequences, and thresholds.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 20. The network connections depicted in FIG. 20 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 20 are exemplary and other means for establishing a communications link between the computers, such as a wireless interface communications link, may be used.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

What is claimed is:

1. A system comprising:
an aerial image database containing sensor data representing a plurality of aerial images of an area having multiple sub-areas;
a processor applying a classifier to the sensor values to identify a label for each sub-area in each aerial image and to thereby generate an initial label sequence for each sub-area;
the processor identifying a most likely land cover state for each sub-area based on the initial label sequence, a confusion matrix and a transition matrix; and
for each sub-area, the processor storing the most likely land cover state sequence for the sub-area.

2. The system of claim 1 wherein each of the labels of the initial label sequence are from a set of labels and wherein the most likely land cover state sequence comprises at least one land cover state that is not in the set of labels.

3. The system of claim 2 wherein the at least one land cover state of the most likely land cover state sequence that is not in the set of labels comprises a mixed land cover state that indicates that the sub-area has land covers associated with two separate labels of the set of labels.

4. The system of claim 1 wherein each of the land cover states of the most likely land cover state sequence are from a set of land cover states and wherein the initial label sequence comprises at least one label that is not in the set of land cover states.

5. The system of claim 4 wherein the at least one label of the initial label sequence that is not in the set of land cover states comprises a "missing" label indicating that the processor was unable to classify the sub-area.

6. The system of claim 5 wherein identifying a label for a sub-area comprises applying the sensor data to a separate decision tree for each label other than the "missing" label and thereby determining that the sensor data should be assigned the "missing" label.

7. The system of claim 6 further comprising constructing the confusion matrix through steps comprising:
determining initial confusion probabilities for each label;
determining a percentage of sub-areas assigned the "missing" label;
multiplying each of the confusion probabilities by one minus the percentage of sub-areas assigned the "missing" label to form adjusted confusion probabilities; and
adding confusion probabilities for the "missing" label to the confusion matrix.

8. The system of claim 1 wherein the transition matrix provides probabilities for each of a set of successive land cover states for a sub-area, wherein the set of successive land cover states comprises: urban-urban, urban-vegetation, urban-water, urban-mixed, vegetation-urban, vegetation-vegetation, vegetation-water, vegetation-mixed, water-urban, water-vegetation, water-water, water-mixed, mixed-urban, mixed-vegetation, mixed-water, and mixed-mixed.

9. The system of claim 1 wherein the confusion matrix provides probabilities for each of a set of label-state pairs, wherein each probability indicates the probability of the label given that a sub-area is actually in the state and wherein the set of label-state pairs comprises: urban-urban, urban-vegetation, urban-water, vegetation-urban, vegetation-vegetation, vegetation-water, water-urban, water-vegetation, water-water, missing-urban, missing-vegetation, and missing-water.

10. A method comprising:
retrieving from memory features for a set of temporally separated images of an area, the area divided into a plurality of sub-areas and each sub-area having separate features for each of the temporally separated images, wherein the set of temporally separated images comprises more than two temporally separated images;
classifying the features of each sub-area of each image such that a sequence of classes is identified for each sub-area, wherein the sequence of classes is ordered based on the temporal order of the temporally separated images;
for each sub-area, computing a change score that indicates a confidence in a change in state for the sub-area between two images using the sub-area's entire sequence of classes, a confusion matrix and a transition matrix;
in response to the change score, generating a user interface for a display to indicate which sub-areas changed state between two images.

11. The method of claim 10 wherein the confusion matrix provides probabilities for each class-state pair in a set of class-state pairs, wherein a probability for a class-state pair comprises the probability of a sub-area being assigned to the class of the class-state pair based on features for an image if the sub-area was in the state of the class-state pair when the image was captured.

12. The method of claim 11 wherein the set of class-state pairs comprise class-state pairs with a mixed state and wherein none of the class-state pairs in the set of class-state pairs contain a mixed class.

13. The method of claim 12 wherein the set of class-state pairs further comprises class-state pairs with a "missing" class and wherein none of the class-state pairs in the set of class-state pairs contain a "missing" state.

14. The method of claim 10 wherein determining the change score comprises determining a combined likelihood for a set of state sequences for the sub-area, the set of state sequences representing all possible state sequences for the sub-area in which the sub-area was in a selected first state for a selected image and in a different selected second state for a selected later image.

15. The method of claim 14 wherein determining the change score further comprises determining a second combined likelihood for all possible state sequences for the sub-area and dividing the combined likelihood for the set of state sequences for the sub-area by the second combined likelihood for all possible state sequences for the sub-area to produce the change score.

16. A computer-readable storage device having stored thereon computer-executable instructions that when executed by a processor cause the processor to perform steps comprising:
classifying each pixel of a set of images into one of a set of classes, each class indicating a type of ground cover present in a geographic sub-area shown in a pixel; and
for a geographic sub-area, identifying ground cover states of the geographical sub-area based on the classes of the geographic sub-area's pixels in the set of images using a confusion matrix to determine a probability of a class given a ground cover state, wherein at least one of the ground cover states is not in the set of classes.

17. The computer-readable storage device of claim 16 wherein identifying ground cover states comprises using a transition matrix that provides a probability for a ground cover state for a geographic area in a first image given a ground cover state for the geographic sub-area in a second image that was captured before the first image.

18. The computer-readable storage device of claim 17 wherein identifying ground cover states comprises identifying a sequence of ground cover states for a geographic sub-area given a sequence of classes for the geographic sub-area.

19. The computer-readable storage device of claim 16 wherein the set of classes includes a "missing" class that indicates that there was insufficient data to classify the geographic sub-area.

* * * * *

UNITED STATES PATENT AND TRADEMARK OFFICE
CERTIFICATE OF CORRECTION

PATENT NO. : 8,958,603 B2
APPLICATION NO. : 13/835022
DATED : February 17, 2015
INVENTOR(S) : Shyam Boriah et al.

It is certified that error appears in the above-identified patent and that said Letters Patent is hereby corrected as shown below:

Specification

Column 8, line 23, please replace "$P(z_t^i = U | \ z_{t-1}^i = U)$" with "$P(z_t^i = U | z_{t-1}^i = U)$".

Column 8, lines 24-25, please replace "$P(c_t^i = V | z_t^i = U) \cdot P(z_t^i = U | z_{t-1}^i = U)$" with "$P(c_t^i = V | z_t^i = U) \cdot P(z_t^i = U | z_{t-1}^i = U)$".

Column 8, EQ. 1, please replace "$\alpha_t^j = m_{y_j} max_k [\alpha_{t-1}^k \cdot P(z_t^i = j | z_{t-1}^i = k)]$" with "$\alpha_t^j = m_{y_j} max_k [\alpha_{t-1}^k \cdot P(z_t^i = j | z_{t-1}^i = k)]$".

Column 11, line 33, please replace "$\alpha_t^j = m_{jc_t} \cdot \Sigma_{i=1}^k \alpha_{t-1}^i \cdot x_j$" with "$\alpha_t^j = m_{jc_t} \cdot \Sigma_{i=1}^k \alpha_{t-1}^i \cdot x_j$".

Column 11, line 36, please replace "$\alpha_1^i = m_{i,c_t}$" with "$\alpha_1^i = m_{i,c_t}$".

Column 11, line 48, please replace "$Allpath = \Sigma_{j=1}^k \alpha_T^j$" with "$Allpath = \Sigma_{j=1}^k \alpha_T^j$".

Signed and Sealed this
Sixth Day of October, 2015

Michelle K. Lee
*Director of the United States Patent and Trademark Office*